United States Patent
Mohi et al.

(10) Patent No.: US 7,474,896 B2
(45) Date of Patent: Jan. 6, 2009

(54) LOCATING SYSTEM AND METHOD

(76) Inventors: Norman Mohi, 157 W. 79th St. Apt. 9A, New York, NY (US) 10024; Kevin Judge, 4028 Via Gavilan P.V., Estates, CA (US) 90274; James R. Hume, 30618 Calle de Suenos, Rancho Palos Verdes, CA (US) 90275; Mark Scislowski, 17632 ¾ Virginia Ave., Bellflower, CA (US) 90706

( * ) Notice: Subject to any disclaimer, the term of this patent is extended or adjusted under 35 U.S.C. 154(b) by 1211 days.

(21) Appl. No.: 10/421,967

(22) Filed: Apr. 23, 2003

(65) Prior Publication Data

US 2003/0195008 A1 Oct. 16, 2003

Related U.S. Application Data

(63) Continuation-in-part of application No. 09/899,612, filed on Jul. 5, 2001, now Pat. No. 6,980,813.

(60) Provisional application No. 60/218,454, filed on Jul. 14, 2000.

(51) Int. Cl.
*H04Q 7/20* (2006.01)

(52) U.S. Cl. ............... 455/456.1; 455/456.2; 455/456.3; 455/432.1; 455/457; 455/414.2; 342/357.03; 340/426.19

(58) Field of Classification Search .............. 455/414.2, 455/421, 440, 432.1, 456.1–6, 457; 342/357.06–9, 342/357.1; 340/426.19–2, 426.22–23, 573.1
See application file for complete search history.

(56) References Cited

U.S. PATENT DOCUMENTS

| | | | |
|---|---|---|---|
| 5,043,736 A | | 8/1991 | Darnell et al. |
| 5,223,844 A | | 6/1993 | Mansell et al. |
| 5,225,842 A | | 7/1993 | Brown et al. |
| 5,289,163 A | * | 2/1994 | Perez et al. ............ 340/539.32 |
| 5,299,132 A | | 3/1994 | Wortham |
| 5,389,934 A | | 2/1995 | Kass |
| 5,398,190 A | | 3/1995 | Wortham |
| 5,418,537 A | | 5/1995 | Bird |
| 5,422,816 A | | 6/1995 | Sprague et al. |
| 5,525,967 A | * | 6/1996 | Azizi et al. ............... 340/572.1 |
| 5,594,425 A | | 1/1997 | Ladner et al. |
| 5,652,707 A | | 7/1997 | Wortham |
| 5,703,598 A | | 12/1997 | Emmons |
| 5,712,619 A | | 1/1998 | Simkin |
| 5,742,233 A | | 4/1998 | Hoffman et al. |
| 5,742,509 A | | 4/1998 | Goldberg et al. |

(Continued)

*Primary Examiner*—Binh K Tieu
(74) *Attorney, Agent, or Firm*—Lawrence S. Cohen

(57) ABSTRACT

A mobile controller unit has a radio positioning system and a two-way communication system and a rover unit also has a radio positioning system and a two-way radio communication system. The controller unit can query the rover unit to send its location data so that the rover unit can be located and if desired, found, such as in the case of a lost child or items. Relative position between the controller and the rover can be displayed on the controller along with an arrow showing where the rover is, as well as how fast it is moving, a track of its movement and other data.

The system can also operate in conjunction with a network system that has a PDE and an application server that perform some of the communications and calculation functions.

54 Claims, 22 Drawing Sheets

U.S. PATENT DOCUMENTS

| | | |
|---|---|---|
| 5,777,580 A | 7/1998 | Janky et al. |
| 5,832,394 A | 11/1998 | Wortham |
| 5,848,373 A | 12/1998 | DeLorme et al. |
| 5,884,221 A | 3/1999 | Wortham |
| 5,223,844 A | 1/2000 | Mansell et al. |
| 6,121,922 A * | 9/2000 | Mohan .................... 342/357.1 |
| 6,268,798 B1 * | 7/2001 | Dymek et al. ............ 340/573.1 |
| 6,300,902 B1 | 10/2001 | Eslambolchi |
| 6,362,778 B2 | 3/2002 | Neher |
| 6,377,210 B1 | 4/2002 | Moore |
| 6,388,612 B1 | 5/2002 | Neher |
| 6,441,778 B1 | 8/2002 | Durst et al. |
| 2001/0026240 A1 | 10/2001 | Neher |
| 2001/0045904 A1 * | 11/2001 | Silzer, Jr. ............... 342/357.07 |
| 2001/0050631 A1 | 12/2001 | Takenaga |
| 2003/0008671 A1 | 1/2003 | Lundgren et al. |
| 2003/0069693 A1 | 4/2003 | Snapp et al. |
| 2003/0191568 A1 | 10/2003 | Breed |
| 2003/0211853 A1 | 11/2003 | Banno |
| 2004/0029558 A1 | 2/2004 | Liu |
| 2004/0039527 A1 | 2/2004 | McDonald, Jr. et al. |
| 2004/0044468 A1 | 3/2004 | Adachi |

* cited by examiner

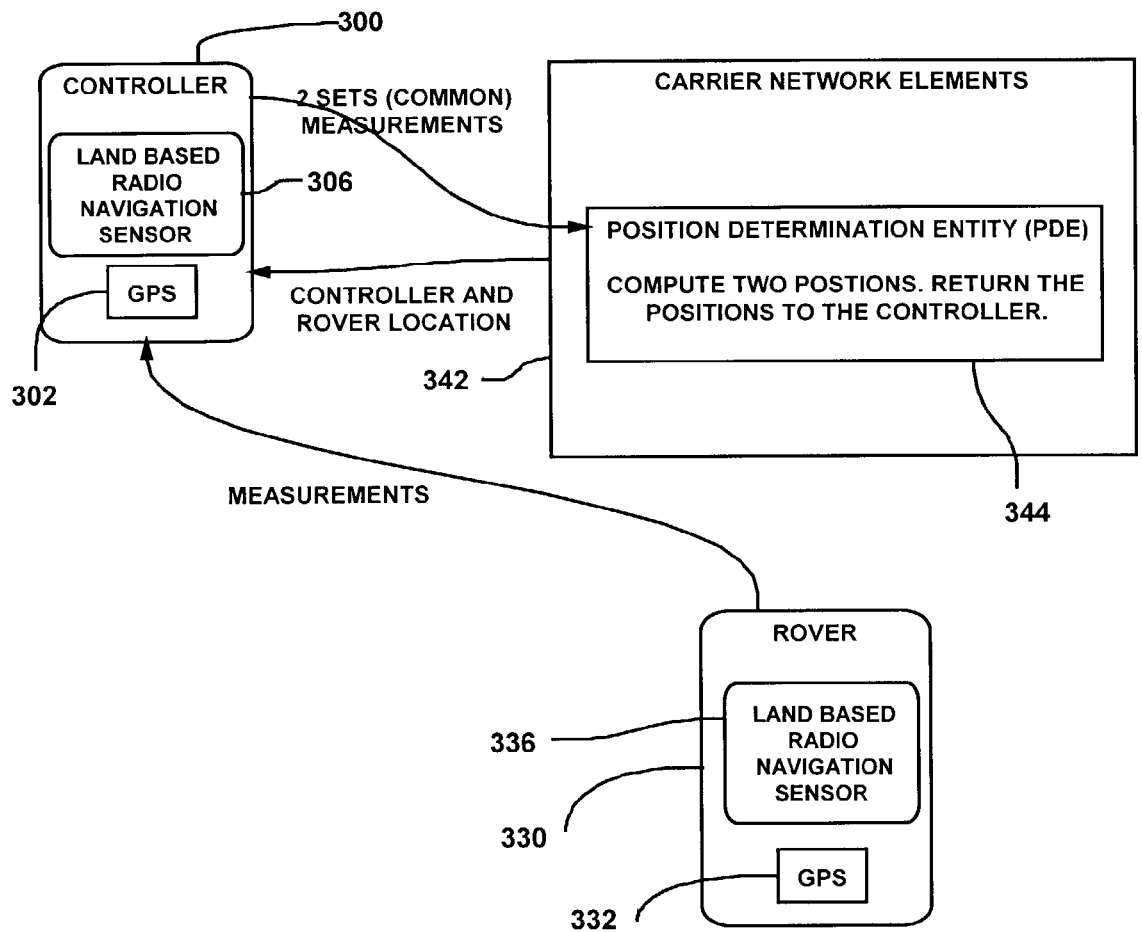
FIG 23a (Option 1)

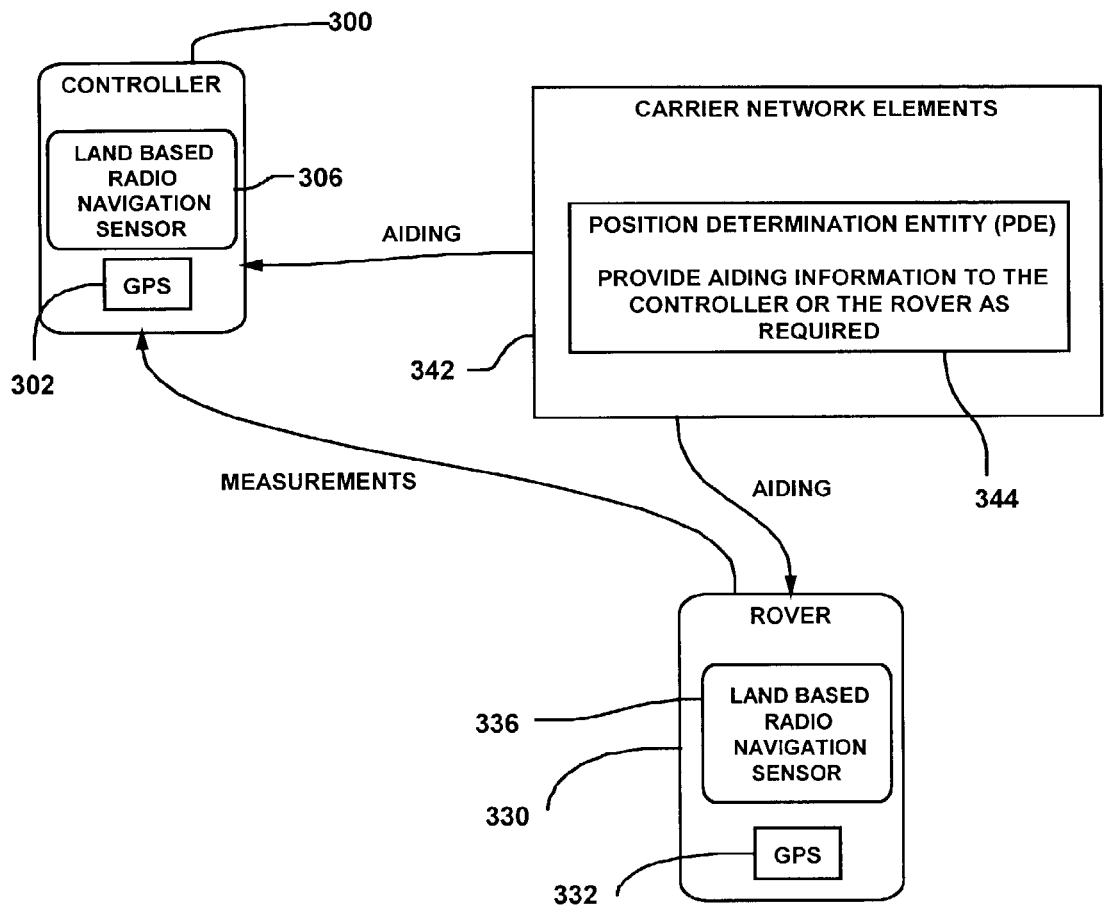
FIG 23b (Option 2)

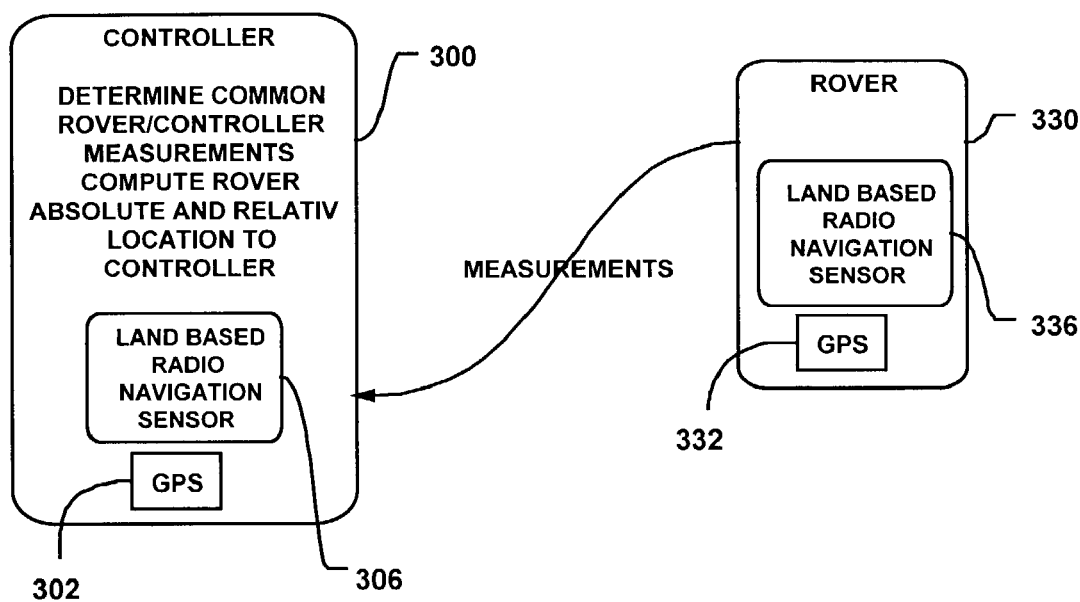
FIG 23c (Option 3)

LOCATING SYSTEM AND METHOD

RELATED APPLICATIONS

This application is a continuation-in-part of utility patent application Ser. No. 09/899,612 filed on Jul. 5, 2001 now U.S. Pat No. 6,980,813 which is a non-provisional utility patent application of provisional application No. 60/218,454 filed on Jul. 14, 2000 that claims priority of that date, the content of all of which are included herein by reference.

FIELD OF THE INVENTION

The invention relates to tracking systems that use a radio positioning system such as GPS and wireless radio communications such as cellular telephone.

BACKGROUND OF THE INVENTION

There are systems that involve a tracking function performed by a centralized and stationary unit. Examples of such systems are shown in U.S. Pat. Nos. 5,594,425; 5,312,618; and 5,043,736. In the usual case, a target's location information is transmitted to a monitoring station where the information is processed and actions taken accordingly. A variation to this is shown in U.S. Pat. No. 5,389,934 which allows the searcher/controller to be mobile; where in one embodiment the system described is a rover which when called by a telephone would become active, relay a voice description of its location and then become inactive; and another embodiment provides an arrow visual to point in the direction of the target, but does not take advantage of the specific spatial relationship calculations used in the present invention.

Currently there is under consideration and implementation a concept referred to as E911 which contemplates that a cell phone user can make a "911" emergency call and a system will exist with a location technology that will enable locating the cell phone without any need to have the user interact. The location technology, the cell phone network and the cell phone (sometimes referred to as a handset) will enable the cell phone's location to be determined and communicated to a responding emergency service.

Numerous location technologies and standards are presently under consideration and implementation in conjunction with wireless networks in general and cellular networks in particular not only for implementation of the E911 capability, but for other purposes as well.

Many papers, announcements and reports describe these location technologies, how they function with wireless networks, in particular cellular networks, their pros and cons, and the ways in which they can provide useful services. A simple Internet search will suffice to find many such publications. Some of them are:

"*Geolocation and Assisted-GPS*", Goran M. Djuknic and Robert E. Richton, a white paper published by Lucent Technologies-this document has a particularly helpful description of the various geolocation technologies;

"*Location Technologies for GSM, GPRS and UTMS Networks*", a White Paper by SnapTrack, A QUALCOMM Company;

"*Geolocation and Assisted-GPS*", by Djuknic and Richton, Bell Laboratories, Lucent Technology published in Computer magazine, February 2001;

"*Assisted GPS: A Low-Infrastructure Approach*", by LaMance, DeSalas and Jarvinen, in GPSWorld, Mar. 1, 2002;

"*An Introduction to SnapTrack Server-Aided GPS Technology*", by Mark Moeglin and Harvey Krasner, published on Aug. 10, 2001 as a White Paper;

"*Satellite-Based Positioning Techniques*", by Jari Syrjarinne, published by Nokia.

"*Hybrid Wireless Assisted GPS Architecture*" a publication by SnapTrack;

"*A Position Determination Service Standard for Analog Systems*" published by TIA/EIA, Jun. 6, 2000 (see also TIA/EIA-553-A);

"*Position Determination Service Standard for Dual Mode Spread Spectrum Systems*" publication of TIA as standard 3GPP2 C.S0022-0-1;

"*High performance wireless location technology*" a news release by TruePosition, Inc.;

"*LOCATION TECHNOLOGIES FOR ITS EMERGENCY NOTIFICATION AND E911*", By Robert L. French and Clement J. Driscoll a paper prepared for ION National Technical Meeting, Santa Monica Calif., Jan. 22-24, 1996. The content of all of these references is incorporated by reference into this specification.

Also an Internet search for the relevant standards bodies such as TIA's 3GPP (principally dealing with GSM networks) and 3GPP2 (dealing with CDMA networks) will provide information about the process of evolving technical standards. With such helpful descriptive material available it will not be necessary to provide exhaustive descriptions except to the extent necessary to understand the configurations of systems and operation of methods of the present invention.

Some of the location technologies are; Assisted GPS (AGPS), network wireless triangulation using Time Difference of Arrival (TDOA), Advanced Forward Link Trilateration (AFLT), Enhanced Observed Time Difference (EOTD), and/or Angle of Arrival (AOA) as well as hybrid solutions such as AGPS augmented with other location technologies that make use of all available measurements be they satellite or land based signals. For the purposes of this specification and claims the phrase: "land based location technology" will be used to define any location technology that makes use of measurements obtained from land based transmitters to form a position solution; such as: AFLT, TDOA, EOTD, AOA, or UTDOA. Also except if the context clearly indicates otherwise the words "position" and "location" are used interchangeably and are considered synonymous.

SUMMARY OF THE INVENTION

The invention resides in a system and method for locating and tracking a mobile rover unit from a mobile controller unit in which the controller and rover are in communication over a communication network and a location technology is used for obtaining and transmitting location related measurement data applicable to computation of the location of the controller and the rover so that the controller can determine the relative spatial position of the rover relative to the controller and the absolute positions of the rover and the controller on a map so that the user of the controller can select display of the relative spatial position of the rover or the absolute map position of the rover. Other information relating to the rover can be determined and provided to the controller including distance from the controller to the rover, the rover's speed, and a history of location of the rover.

The invention further resides in a system and method that can be referred to as autonomous GPS for locating and tracking at least one rover unit from a mobile controller unit, where the mobile controller unit has a radio communication device and a GPS module and the rover has a radio communication device and a GPS module, the controller also having a computer specially programmed to receive GPS position information from the rover unit by way of the radio communication device and using its own GPS module, calculate the relative position and bearing of the rover unit, and using a display on the controller unit showing a relative bearing, distance and altitude difference, or alternatively, map positions of the controller and the rover using available map data. The radio communication module enables the controller and the rover to communicate with each other and is preferably a cellular telephone network. The GPS information sent by the rover to the controller can be in the form of processed map coordinate data such as latitude and longitude or it can be in the form of unprocessed raw measurement data such a pseudorange data. In the preferred embodiment the controller and the rover track the same GPS satellites which enables a high accuracy result for providing the relative spatial positions of the controller and the rover as well as their absolute map positions The invention further resides in forms of the system and method in which location technologies such as land based location technologies or GPS are assisted by network elements that can gather measurement data, perform calculations, provide assistance data to the rover and controller handsets, and send calculated or raw position data to them.

The invention includes features usable in the controller such as showing a history of the position of the rover, showing the height and velocity of the rover and other useful information.

The controller unit allows the user to select from displayed options, a selected rover from a stored directory of rovers to activate a "FIND" process to obtain the selected rover's GPS position relative to the controller's GPS position. Also, the rover unit has a stored history of its positions so that a historical trail of the rover's positions can be sent to the controller and displayed. Also, selective alarms may be programmed from the controller, into the rover or directly into the rover so that when the rover violates the alarm limit, the rover automatically signals the controller and the controller's display shows the rover's relative or absolute position, along with a signal as to the basis for the alarm. Alarms may be spatial such as a boundary or radius passed or may activate at a speed limit, if the rover starts to move faster than the alarm limit. Also, the rover may be equipped with a manually activated alarm to signal the controller.

Thus the invention has as one use for keeping in touch with children, periodically determining a child's location or trail of movement, or alarm limit violation.

While use of GPS is described above, other radio positioning systems can be used. These include GALILEO, GNSS, LORAN, GLONASS and others.

Further embodiments of the invention include or are used with location technologies that operate in conjunction with cellular networks. Such systems are under development for other purposes such as to implement the E911 requirements; they can be adapted to provide the location information to enable the controller to locate and track the rover including the feature of selectively displaying on the controller display the relative spatial position of the rover to the controller and the absolute positions of the controller and the rover. Usually absolute position will be on a map, but absolute position can be expressed and displayed in other forms such as by giving coordinates, or latitude and longitude, street intersection, address, neighborhood, etc.

In a particular embodiment the invention uses an application server that operates with the communication network and its associated location elements such as a PDE. The primary purpose of the application server is to obtain either directly or indirectly the position measurement data of both the controller and the rover including the source indicators, such as in the case of GPS satellites, the PRN numbers or in the case of land based technologies the transmitting antenna identification. Then, the application server will filter the incoming transmission from the controller and the rover to determine the most common sources of measurement data. Once the most common sources are identified the positions of the controller and the rover are determined using the most common sources as determined by the application server. Of course complete commonality gives the best result, but this is not always possible, so the application server is programmed not only to specify sufficient numbers of location data sources for proper location calculation but also to use the best selection of commonality The invention can be implemented in a service for users whose handsets are appropriately equipped with a specially programmed application server deployed in communication with the communication network being employed. The application server does the filtering to obtain the most commonality of satellites or of ground based sources of measurement data.

Another method for achieving precise relative location of the rover with respect to the controller is to compute relative differential corrections from the measurement taken at the controller and applied to the measurements taken at the rover. This is done by using pseudorange residuals from the measurements taken at the controller to create corrections and then applying the corrections to the rover measurements. The corrections can be generated either within the controller or within the network.

BRIEF DESCRIPTION OF DRAWINGS

FIG. 23a (option 1) is a system operation diagram.
FIG. 23b (option 2) is a system operation diagram.
FIG. 23c (option 3) is a system operation diagram.

DETAILED DESCRIPTION

Figure 1:
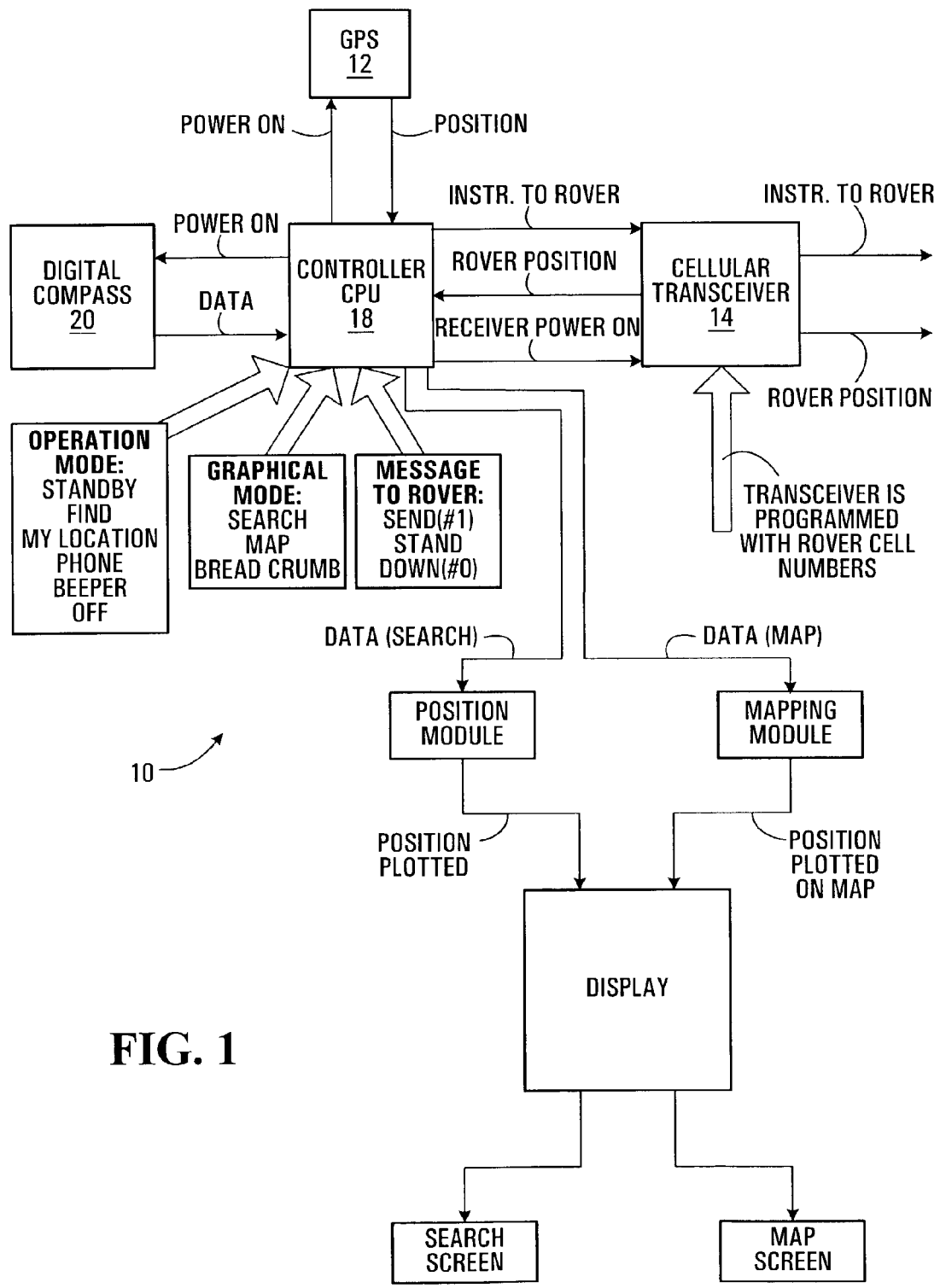
FIG. 1 shows a controller unit operational diagram.

The method and apparatus of the present invention is intended, as a primary application, to enable a person to find a valuable asset that could be a person, upon command and to high precision. An exemplary purpose is such as to enable a parent to find a child.

The system is comprised of a personal hand held unit (controller), and a small, compact, and optionally concealable unit (rover). Each controller unit gives the user the ability to ascertain the precise location of one or more rover units. In addition to all the functions and features of the system as described herein, the system is unique in that each controller unit is a self contained, mobile unit that can provide to the user all the real-time information necessary to locate and find any rover. While the detailed description explains the process of a controller finding a rover, the system can also support a controller finding one or more other controllers. Therefore the term "rover" as used herein means a handset that functions as a rover which can include a device equipped solely as a rover or a device equipped to function both as a controller and a rover, unless the context requires otherwise. Also the terms "controller" and "controller unit" and "rover" and "rover unit" are respectively used herein interchangeably and no distinction is intended.

The controller unit comprises several primary sub-components including a radio communication module such as a cellular telephone module, a radio positioning receiver/processor module such as a GPS receiver/processor module, an electronic compass, a display, a computer and associated electronics to operate it. The controller provides three distinct and interactive and useful functions. First, the controller unit is a fully functional cellular telephone with all the typical functions and features. Second, the controller unit can display its own position and the position of a rover unit on a street map. Third, the controller unit provides the relative spatial location (position) of any rover displaying a bearing arrow and distance. Other information can also be displayed on the controller such as the rover's speed, the rover's height relative to the controller, and a trail of prior positions of the rover.

To operate the system as a locator for a rover, the user selects the FIND feature on the controller screen. The screen displays all the pre-programmed rover names and location addresses such as cellular telephone numbers. The user selects a specific desired rover and touches GO on the interactive screen. The controller unit opens communication with the rover unit by cellular telephone. Using each unit's GPS or other location module, the controller unit determines its relative spatial relationship with the rover. In one display mode, the controller unit displays the rover unit's location on a street level map, which is capable of zooming and scrolling. Through continuing data from the rover unit, the rover unit's position is tracked on the map as GPS information is sent from the rover unit to the controller unit. In another display, the relative bearing location of the rover unit relative to the controller is displayed as an arrow accompanied by information. In order to obtain use of this arrow feature, a heading for the controller unit has to be established. Heading can be established on an initiation basis by use of a compass without movement. Also, as is well known, GPS can only provide heading when the receiver is moving. The arrow displays the bearing of the rover relative to the controller taking into account the location of the rover unit, the location of the controller unit, and the heading of the controller unit based on its GPS or other location sensor data and optional digital compass data. The information displayed along with the arrow preferably includes controller unit to rover unit distance, rover unit velocity, rover unit height relative to the controller unit, the time at which the rover unit's data was ascertained and the rover unit's coordinate system location such as latitude, longitude and elevation. The arrow display is used primarily when the controller unit and the rover unit are relatively close, such as in a neighborhood, where a directional arrow is useful for the controller unit user. To implement these displays, the controller unit receives GPS data which makes it possible to determine the relative spatial relationship of the controller unit and the rover unit to high precision, as good as 1 meter accuracy. In order to achieve this precise relative spatial relationship, the rover unit and the controller unit gather and share GPS measurements of pseudorange and carrier phase or only pseudorange measurements from the same GPS satellites. Much of the error in GPS positioning occurs due to errors that are common to the two receivers making measurements close in time and space. Therefore, having knowledge of the two receiver's GPS measurements allows for removal of the common errors and consequently, a precise calculation of the relative spatial orientation of the two units as well as good knowledge of the units' absolute position. Optionally, the bearing and distance information can be presented in an audible fashion.

The methods and apparatus to obtain the high precision relative position between the rover unit and the mobile controller unit may be implemented using known techniques—with GPS. When the rover and controller are fairly close together, their satellite suite reception is likely to have great overlap, perhaps even complete commonality. As they are more separated the commonality may decrease. In use, the preferred method is that the controller will query the rover to have the rover send to the controller time tagged pseudorange and carrier phase measurement or only pseudorange measurements on a per satellite basis, and the controller will only use the information from those satellites which it is commonly tracking. The information will be used in the controller unit to compute a precise directed distance between the controller and the rover. This information can be displayed on a map on the controller as two points or location indicators, one for the controller and one for the rover. Also, the rover can be tracked by time-sequenced positions that can be derived from prior information stored in the rover.

An optional procedure would be that the controller asks the rover to send data only for a specified subset of satellites such as all or some of those, which are being tracked by the controller.

Another optional procedure would be that the controller sends its satellite suite information to the rover and the rover does the computation and sends back its calculated position using only the common satellites.

A further option would be that the controller tells the rover which satellites it is tracking and the rover sends back information from the four common satellites with the best GDOP.

In another embodiment, the controller unit can be sent historical GPS information for the rover unit, which can be displayed as a series of points on the display map or using the controller unit position as a series of points relative to the controller unit to show a trail of travel of the rover over time both historically and contemporaneously, while being displayed.

Another feature is that the controller unit can activate an audible alarm or chime on the rover unit to facilitate finding the rover audibly.

In another feature, preselected limits or boundary conditions set for the rover unit which when the limit or boundary condition is violated or exceeded can self-activate a communication to the controller unit and an alarm signal and automatically display the relative spatial relationship or map relationship between the controller unit and the rover unit. As a cellular telephone, the controller unit can establish voice communication with the rover unit.

Should the controller unit not have the necessary map data for the current positions of the controller unit and the rover unit, it can access a central database via a cellular radio link and download the necessary map data and then resume tracking of the rover unit. Also a normally active alarm condition can activate the system to find the rover on the controller unit.

In the exemplary application, a parent is in possession of a controller unit while a rover unit is in the possession of a child. As described below, the person operating the controller unit can find the rover unit and sees on the display the relative spatial location (position) or the absolute map location of the rover unit. Other capabilities are also available, as described below.

It is contemplated in the exemplary application that a parent or equivalent will be in possession of a controller unit, and rover units will be in the possession of one or more children. The rover units can be very small, and are preferably concealed, as it is a purpose of the invention to allow locating of the child even in the event of foul play, although much of its use contemplates merely checking up on the child, or finding a lost child.

To be operable at least one controller unit and at least one rover unit is needed. There may be a plurality of controller units, such as for two or more persons who desire to track rover units. There will be as many rover units as needed for the persons to be tracked, such as one or more children. Each controller unit can track all of the rover units, or if desired only selected rover units. A set-up procedure is implemented in which the cellular numbers of each rover unit are programmed into the controller unit, along with an identity code, for automatic dialing. Also, each rover unit is programmed for dialing the controller unit, or if there are more than one controller units, for dialing them selectively or automatically in a selected order or simultaneously. Notably, the basic system does not allow for or need any steps to be taken at the rover unit to operate the system (except in the case of the "alarm" procedure which will be explained). Therefore, the cellular transceiver of the rover unit is activated by commands from the cellular transceiver of the controller unit.

Figure 2:
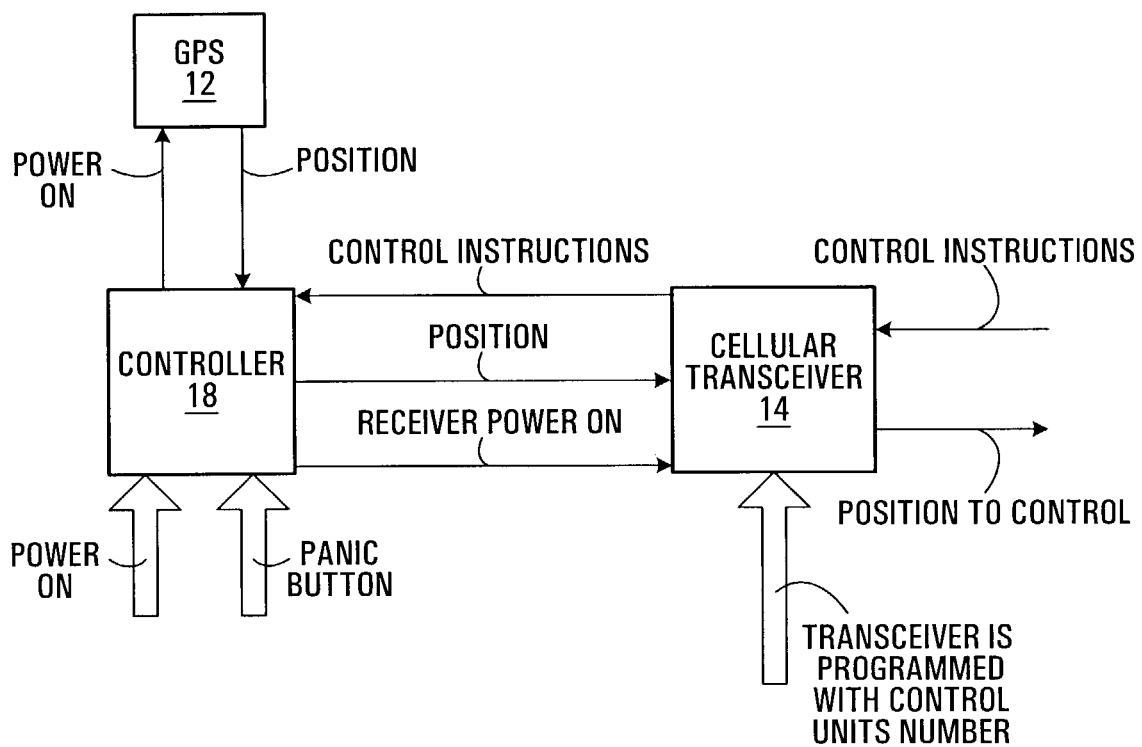
FIG. 2 shows the rover unit operational diagram.

FIGS. 1 and 2 show general block diagrams for the controller and the rover unit modules and their interrelationship. The controller unit 10 has a GPS receiver module 12, a cellular transceiver module 14 a display module 16 and control electronics module including a specially programmed CPU 18 and a digital compass 20. The display 16 is preferably an interactive display such that various command options can be displayed and activated by touching the display screen. In a non-interactive display command options can be actuated by conventional button operation. Software modules include the Operation Mode Module 22, the Graphical Mode Module 24, and the Message To Rover Module 26. Outputs of the CPU 18 include the Position Module 28, which operates the Search Screen Module 30, and the Mapping Module 32, which operates the Map Screen Module 34.

The rover unit 36 has a GPS receiver 38, a cellular transceiver 40, and a control electronics module including a specially programmed CPU 42. Use of the apparatus and method is best understood with reference to the flow diagrams of FIGS. 3-11 as well as the screen diagrams of FIGS. 12-15.

Figure 3:
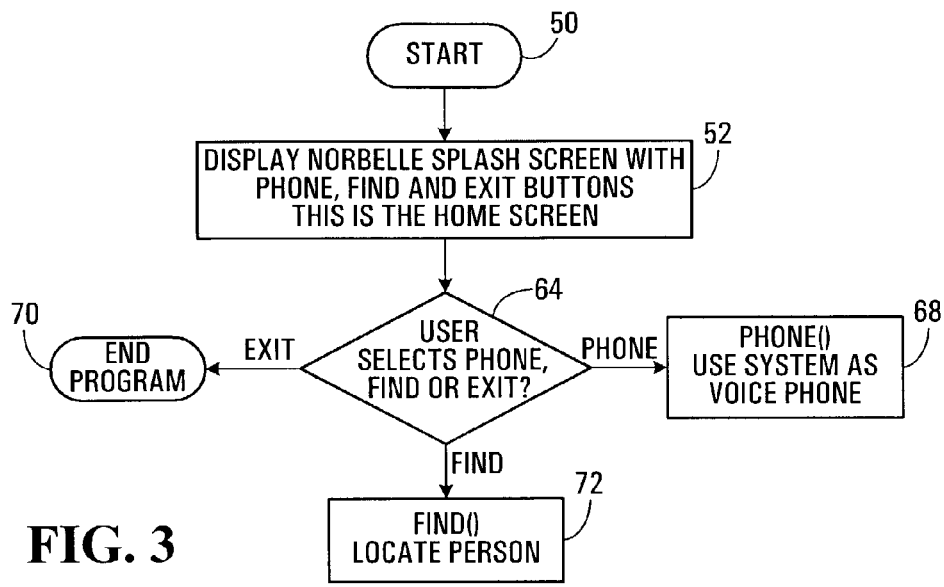
FIG. 3 is a flow chart of the controller start procedure.

Referring to FIG. 3, the controller unit is activated by a power-on step indicated as start 50. This causes the display 52 to open. As shown on FIG. 12, this display, called the home screen 54 has buttons for PHONE 56, FIND 58, EXIT 60, AND HOME 62 (which should be muted on the home screen 12). The user selects one of these as at step 64 on FIG. 3. PHONE selection allows use as at 68 as a conventional voice cell phone between the controller unit and a selected rover unit or as a general use cellular phone. EXIT selection turns off the controller unit as at 70. FIND selection begins the find procedure as at 72.

Figure 4:
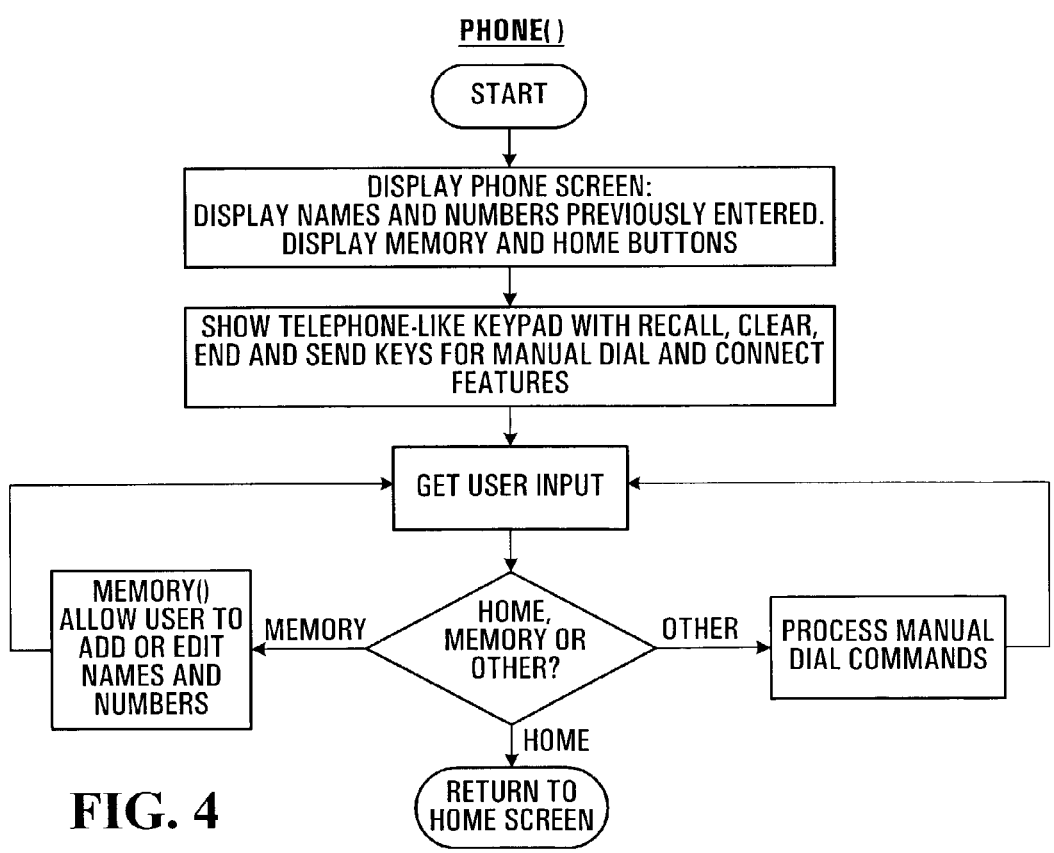
FIG. 4 is a flow chart of the phone start procedure.
Figure 5:
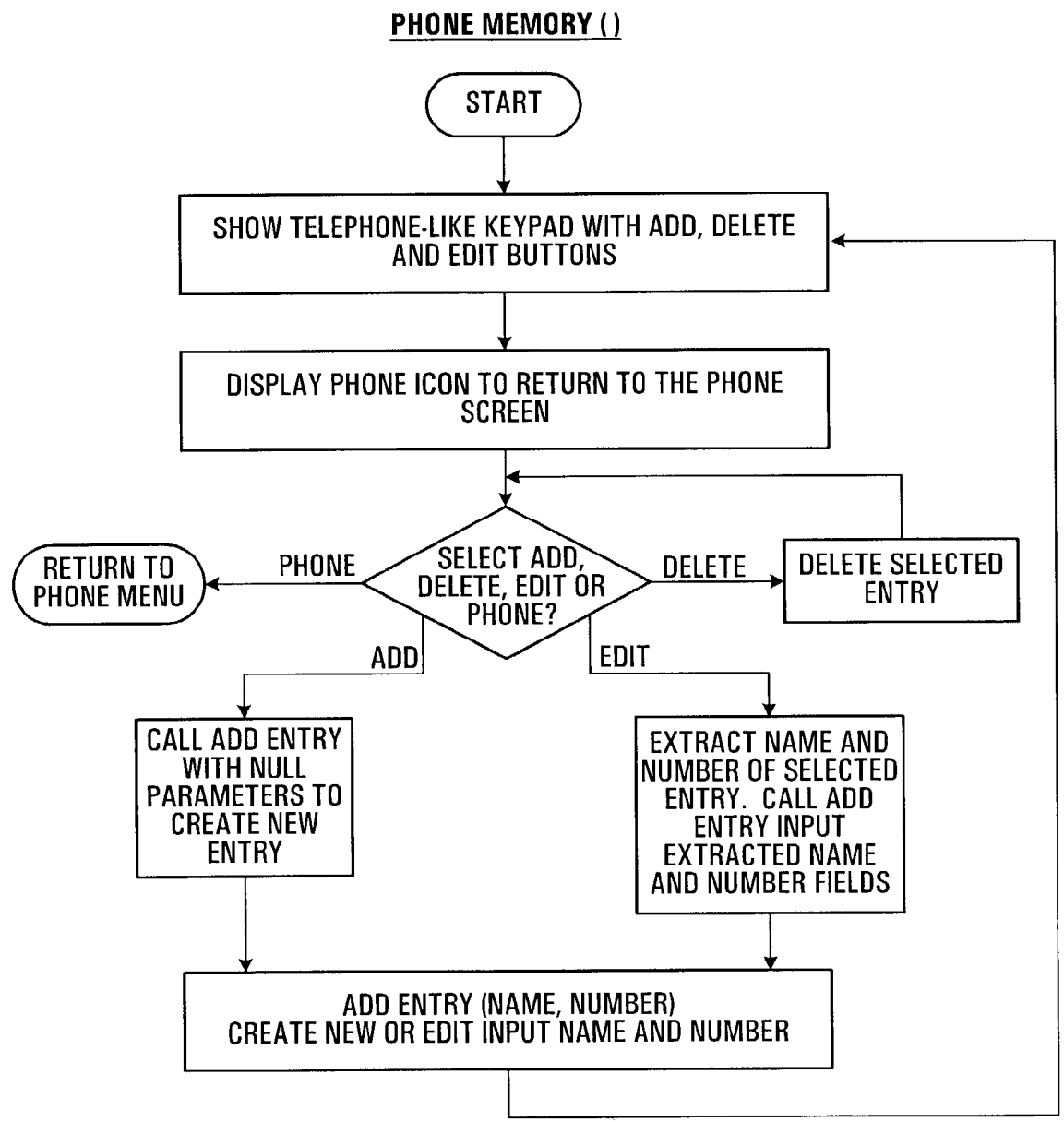
FIG. 5 is a flow chart of the phone memory procedure.
Figure 6:
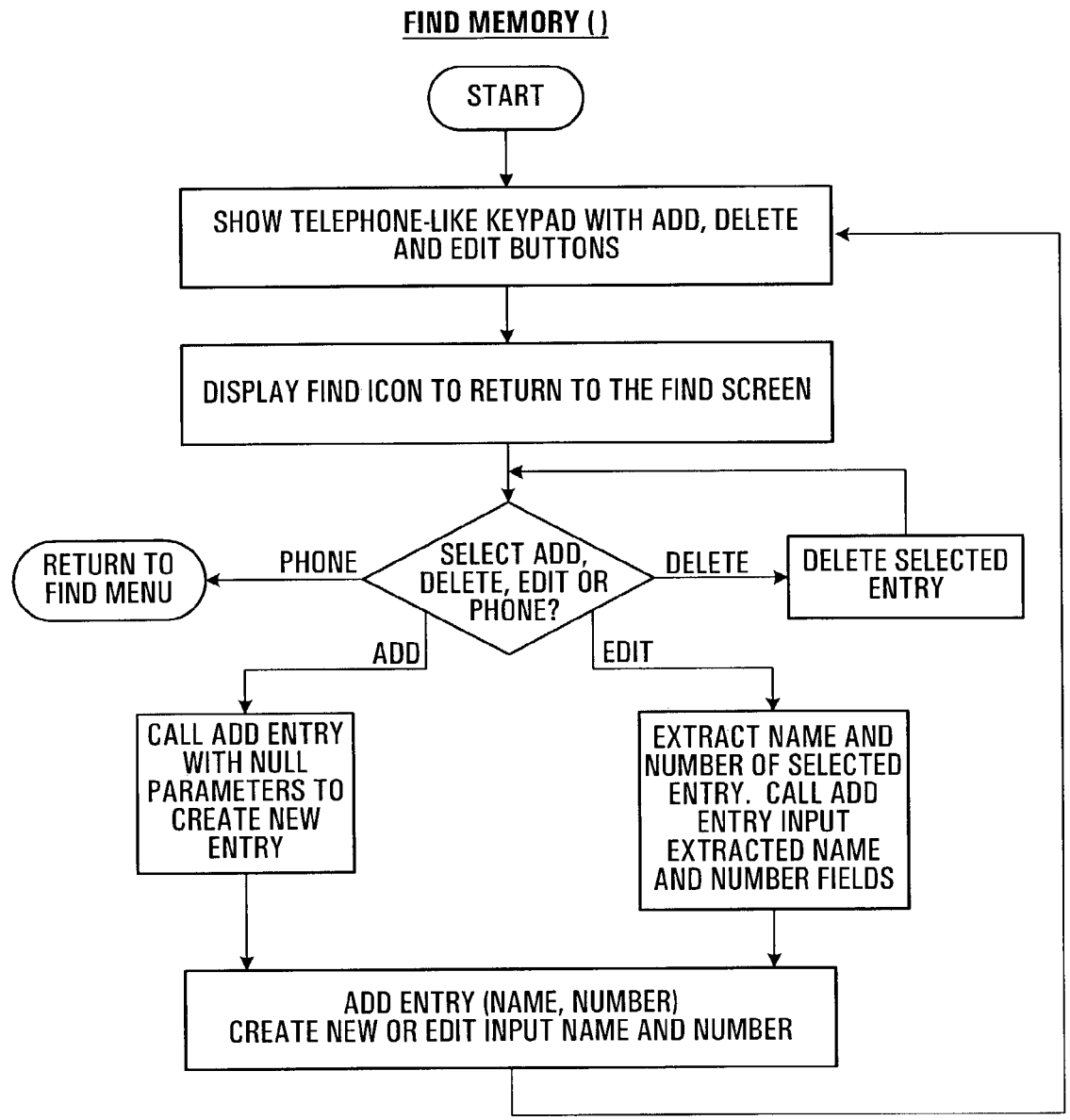
FIG. 6 is a flow chart of the find memory procedure.
Figure 13:
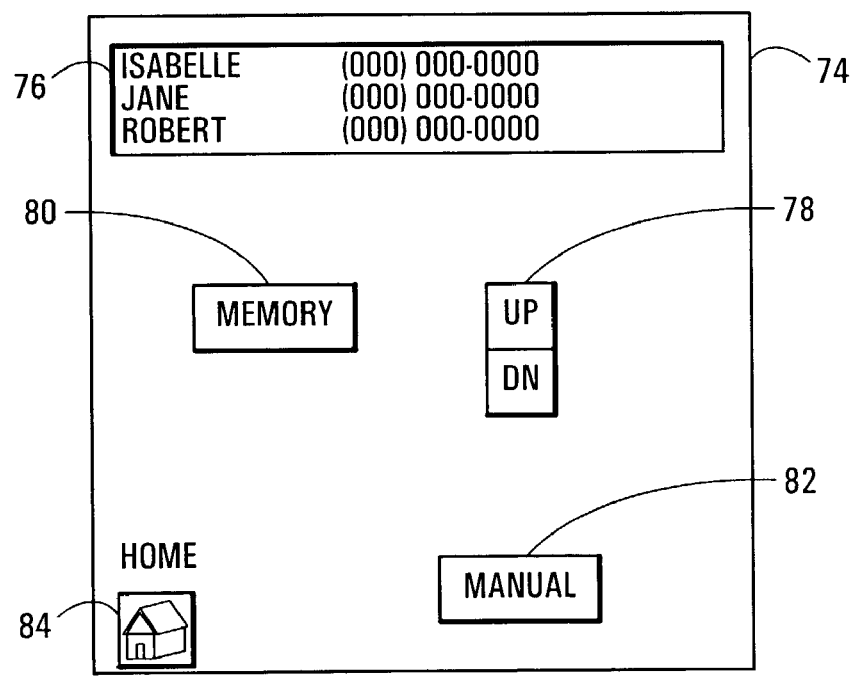
FIG. 13 is a diagram of an interactive phone screen.
Figure 14:
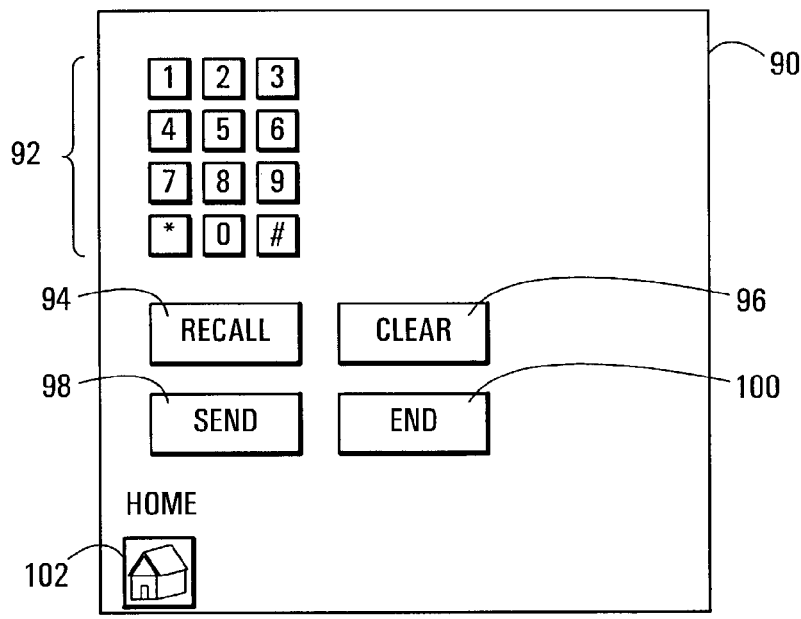
FIG. 14 is a diagram of an interactive manual phone screen.

FIG. 4 shows the procedure if the PHONE button 56 (FIG. 12) was touched. This opens the PHONE screen 74, FIG. 13, which has a scrollable list of preprogrammed numbers 76, an Up/DOWN scrolling button 78, a memory button 80, for adding or deleting numbers, a MANUAL button 82 for going to the screen of FIG. 14 for normal telephone use, and a home button 84 to return to the home screen, FIG. 12. If the manual button 82 is touched, the screen 90 of FIG. 14 appears. It has a touch pad 92, a RECALL button 94, a CLEAR button 96, a SEND button 98, END button 100 and HOME button 102. The screens of FIGS. 13 and 14 are for programming numbers (FIG. 13) and using the controller unit as a voice cellular telephone (FIG. 14). The use of the buttons on FIG. 14 are conventional to cellular telephones.

Figure 12:
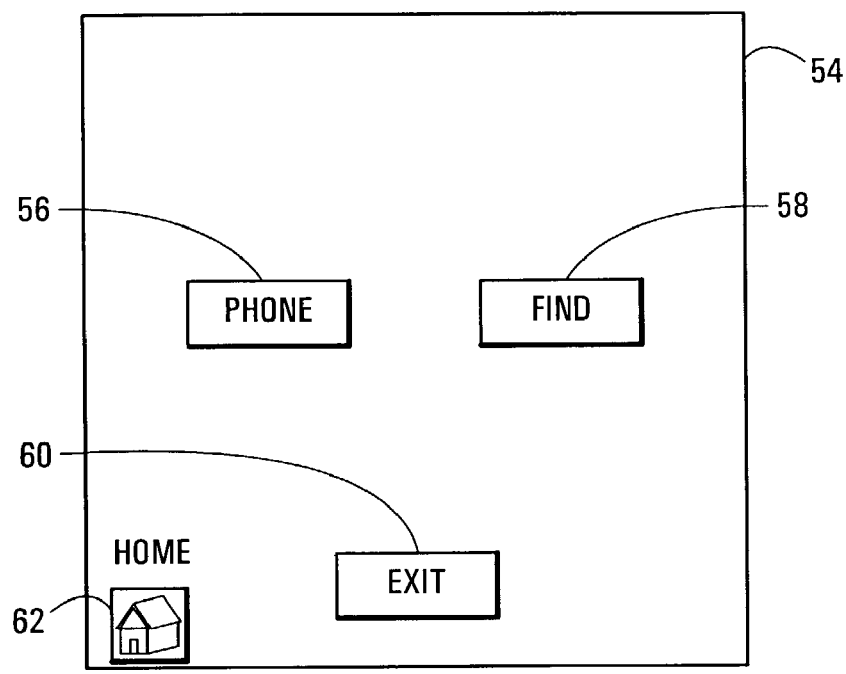
FIG. 12 is a diagram of an interactive home screen.
Figure 15:
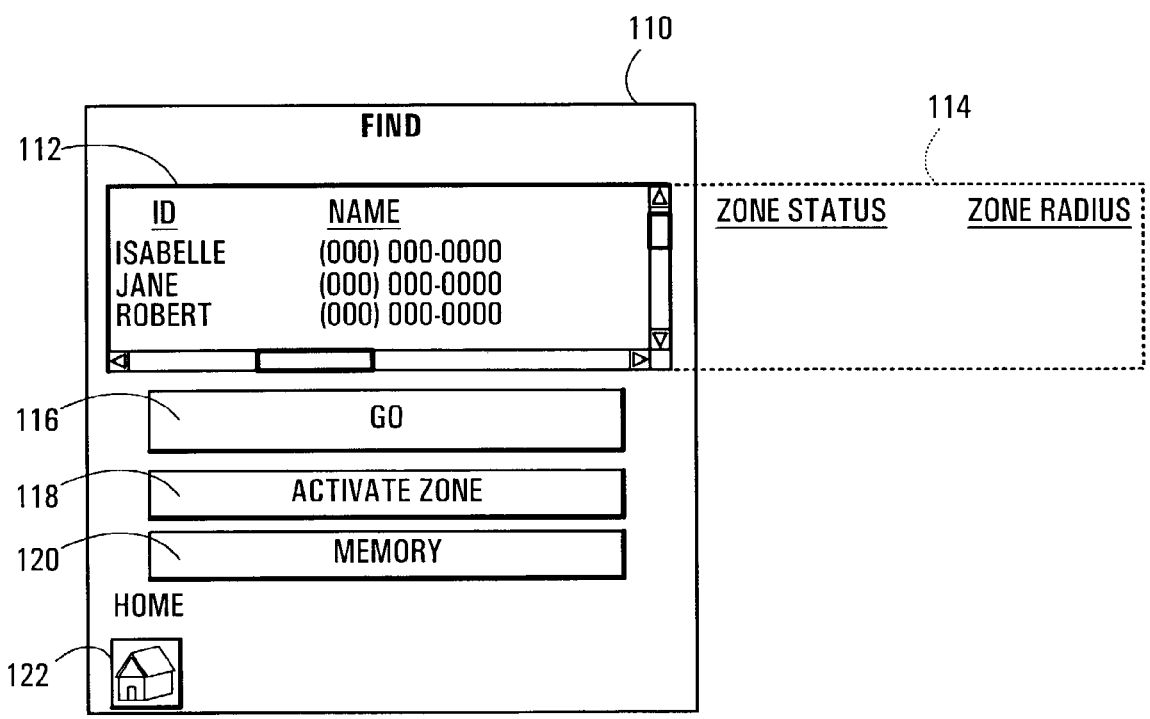
FIG. 15 is a diagram of an interactive find screen.

At FIGS. 3 and 12, if the user selects FIND, the find procedure of the invention is begun. A FIND screen 110 as shown at FIG. 15, appears on the display. This screen has a scrollable NAME window 112, which may be scrolled vertically to select a rover or horizontally as shown at 114 to display preprogrammed alarm criteria for each rover such as ZONE STATUS and ZONE RADIUS.

Figure 16:
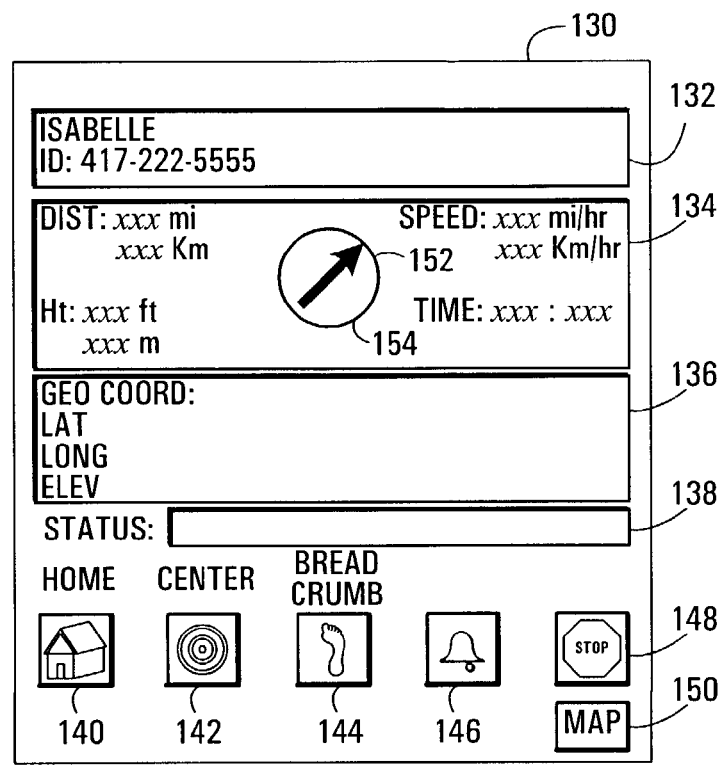
FIG. 16 is a diagram of an interactive find detail screen.

The GO button 116 of the FIND screen FIG. 15 activates the FIND DETAIL screen of FIG. 16. The ACTIVATE ZONE button 118 allows programming and activating a zone radius. The zone radius will be displayed at ZONE RADIUS and communicated and stored in the rover unit, which is programmed to automatically call the controller unit and sound and/or display an alarm if the zone radius is passed. ZONE STATUS shows whether the zone option is on or off. The MEMORY button 120 stores a zone radius selection. The HOME button 122, returns the display to the HOME screen, FIG. 12. The memory/programming procedure is shown in the flow diagram of FIG. 6, FIND MEMORY.

Figure 7:
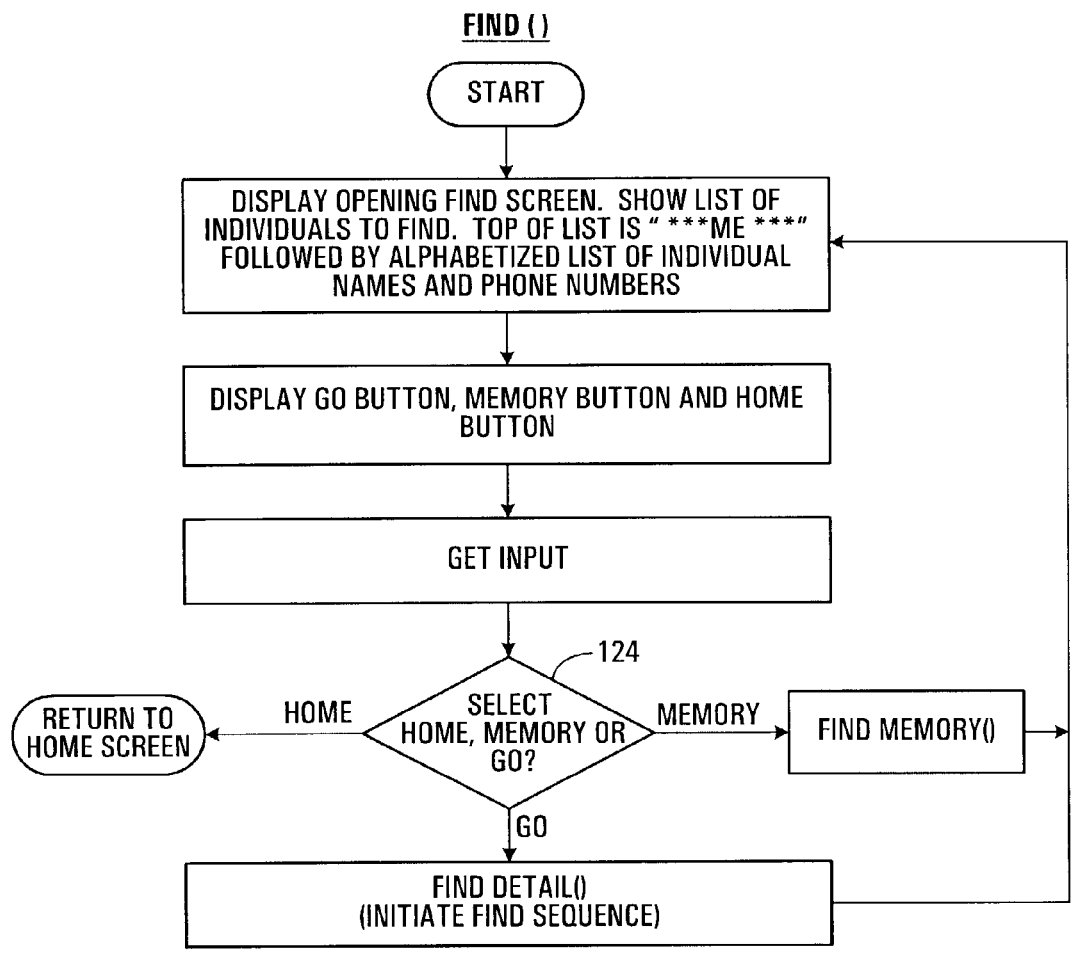
FIG. 7 is a flow chart of the find procedure.

With the FIND screen 110, displayed, the procedure shown in FIG. 7 is implemented. The scrollable NAME window 112 has a list of names and phone numbers that have been preprogrammed. The user now selects HOME, MEMORY, or GO, 124. If the MEMORY button 120 is touched, the FIND MEMORY procedure begins (FIG. 6) which allows programming or deleting on the NAME window 112.

Figure 8:
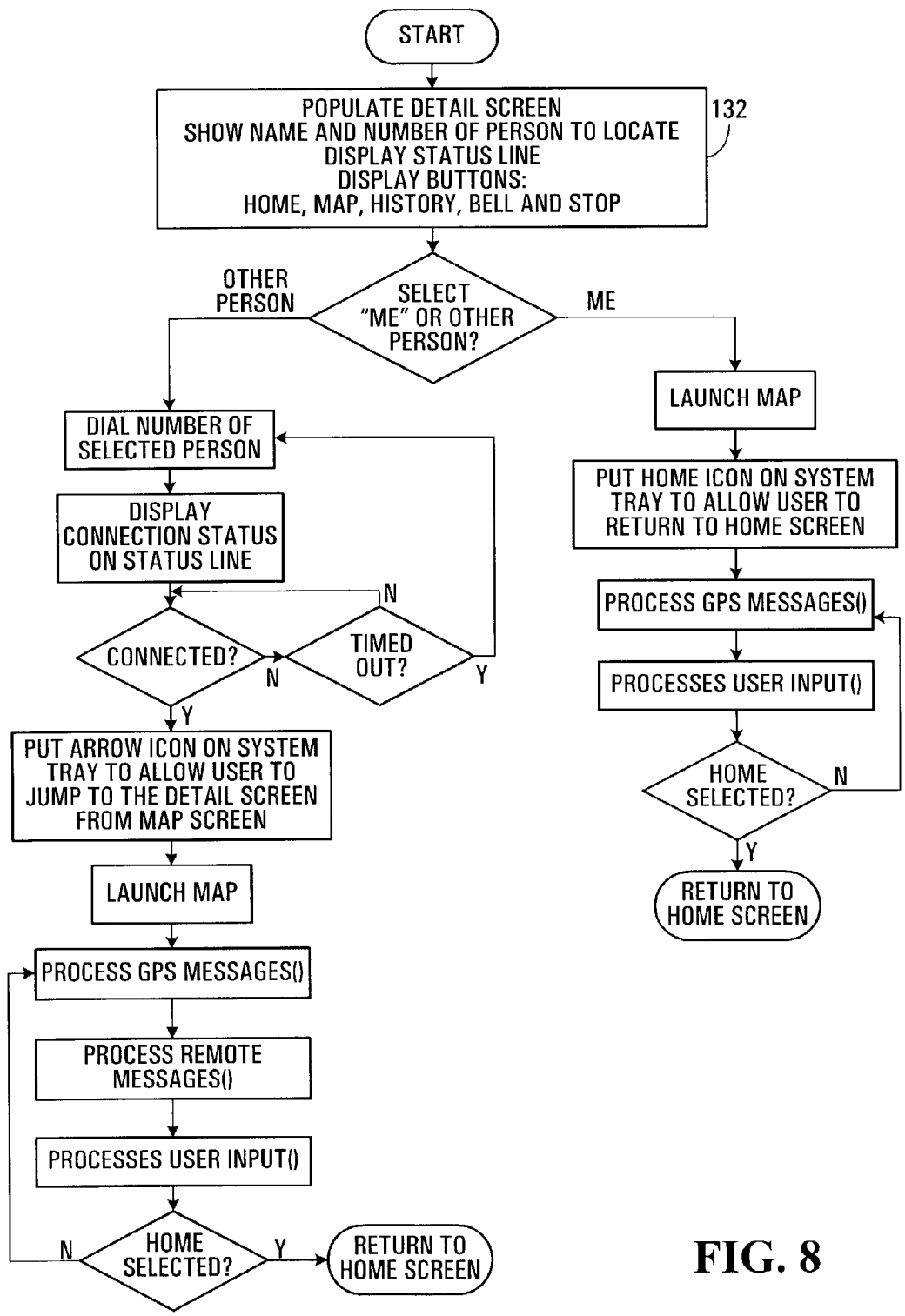
FIG. 8 is a flow chart of the find detail procedure.
Figure 9:
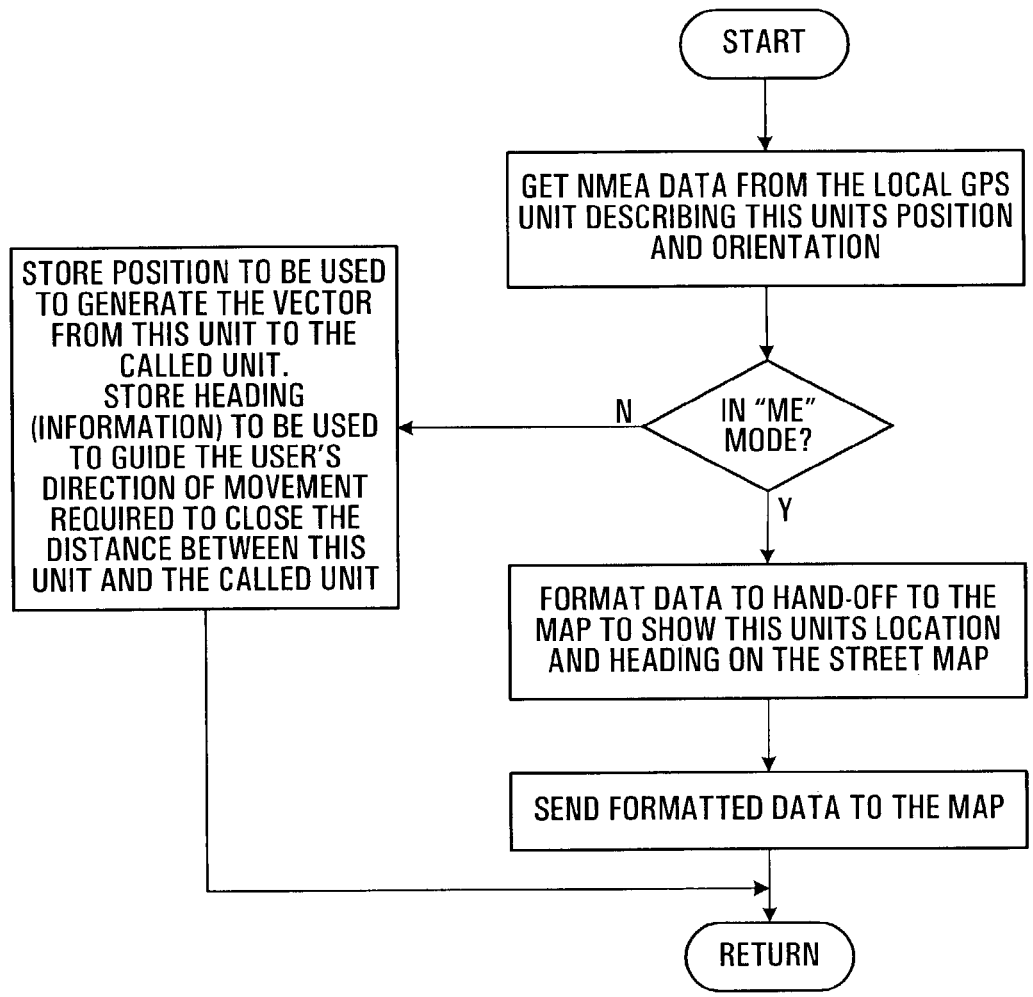
FIG. 9 is a flow chart of the process GPS messages procedure.
Figure 10:
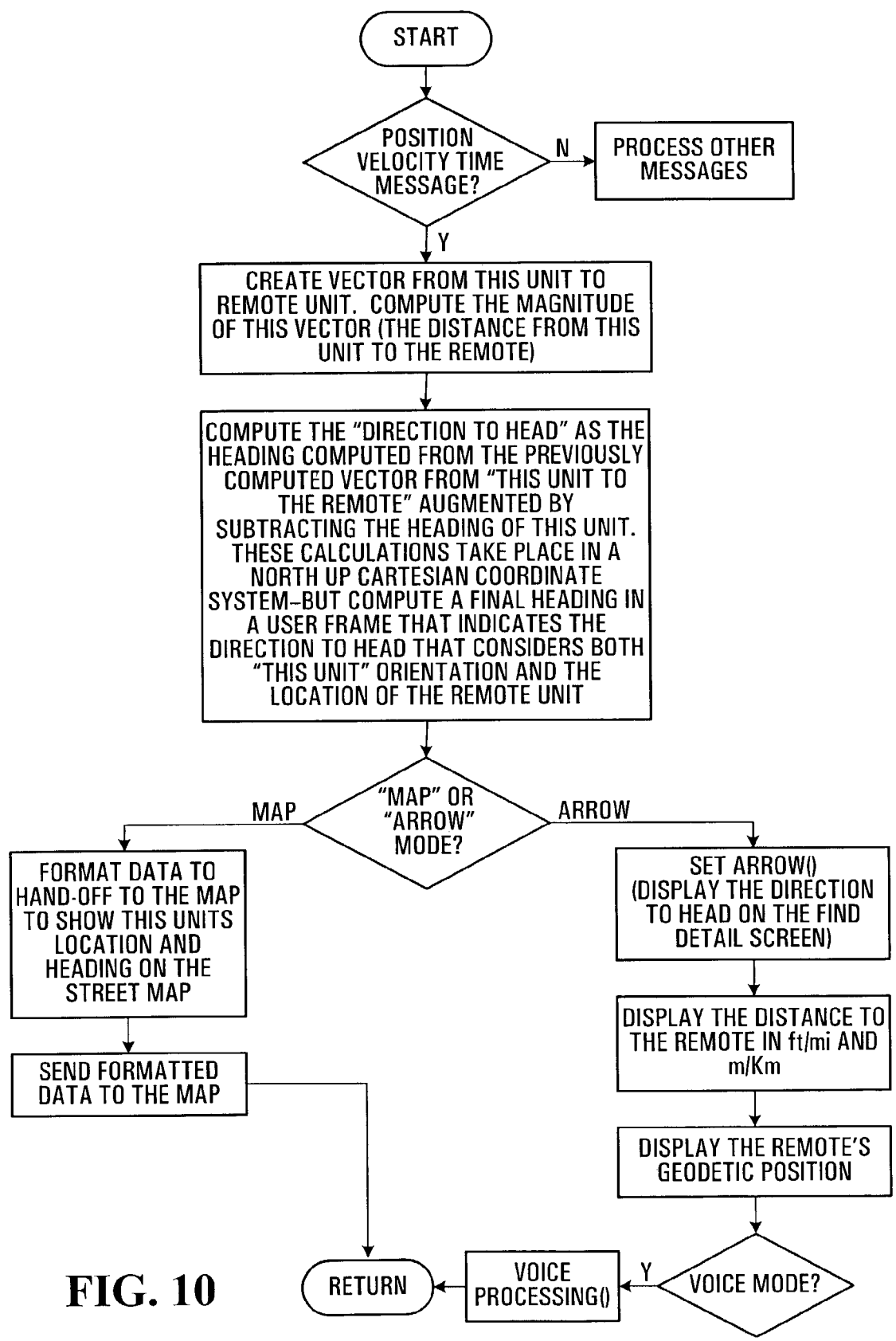
FIG. 10 is a flow chart of the process remote messages procedure.
Figure 11:
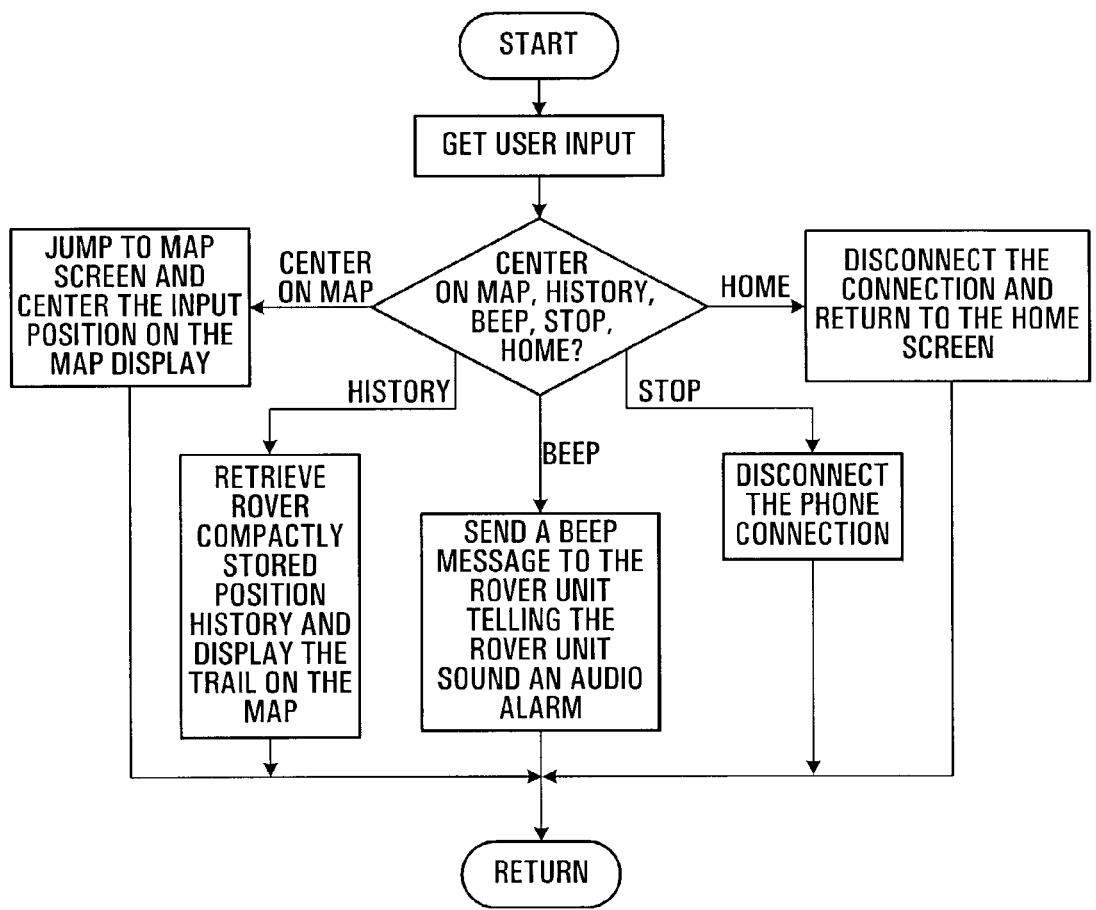
FIG. 11 is a flow chart of the process user input procedure.

If the GO button 116 has been touched, the FIND DETAIL procedure of FIG. 8 is begun and the FIND DETAIL screen 130, FIG. 16, is displayed. As shown in FIG. 8, the FIND DETAIL procedure starts at 132 from the prior touching of the GO button 116 of the FIND screen of FIG. 15 to bring up the FIND DETAIL screen of FIG. 16.

The FIND DETAIL screen 130 has an identification window 132, a location and data window 134, a geographical coordinates window 136, a status window 138, and buttons, HOME, 140, CENTER, 142, BREAD CRUMB, 144, ALARM, 146, STOP 148 and MAP, 150.

Within the location and data window 134, a reserve 152 shows a bearing arrow 154 for relative spatial positioning of the rover to the controller, in which the arrow shows the bearing of the rover unit relative to the controller unit. This is accomplished using the electronic compass module (FIG. 1) or, alternatively, using movement of the controller to determine its heading from GPS. Relative distance, relative height, and speed of the rover and time are also displayed.

Figure 17:
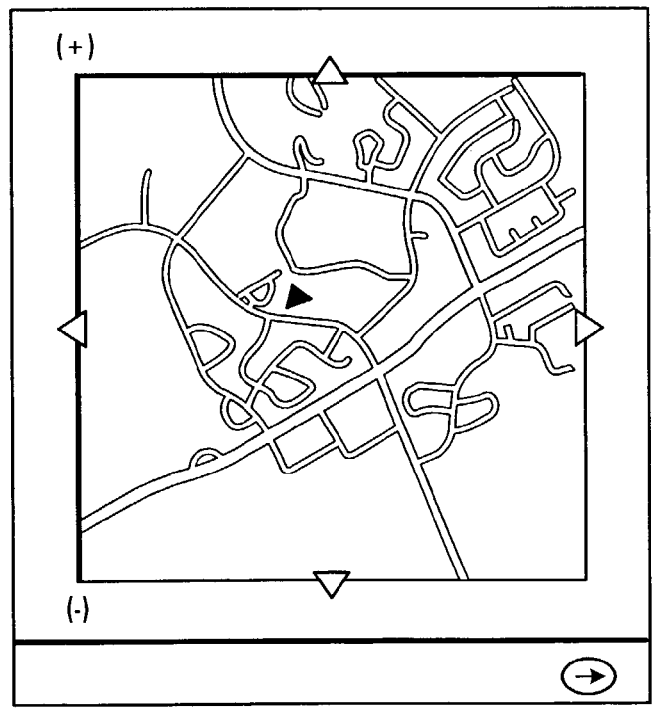
FIG. 17 is a diagram of an interactive map screen.

Touching the HOME button 140 returns to screen FIG. 12. Touching the MAP button 150 brings up the MAP screen of FIG. 17 that will show the positions of the controller and the rover on the map so long as they are sufficiently close to appear on the same map; otherwise the rover will be shown on a map. The BREAD CRUMB button 144 is used with the MAP button 150 which will also activate the MAP screen FIG. 17 and will show the positions of the controller and the rover on a map, and with the BREAD CRUMB feature activated, will show a number of prior positions of the rover and will continue to display sequential periodic positions of the rover. The MAP screen FIG. 17 has an arrow icon or button 152 which when activated will return the display to the FIND DETAIL screen FIG. 16. The various functions and options can be selected from displays rather than from discrete buttons. The CENTER button 142 centers the target/rover on the map of FIG. 17 in case the user has scrolled off. The ALARM button 146 activates an alarm on the rover so that it may be found audibly.

FURTHER EMBODIMENTS

In a further embodiment the invention can be implemented by the controller and rover locations being provided wholly or in part or with the assistance of location technologies integrated with or otherwise working in conjunction with the cellular network with which the controller and rover are connected. In a more general case any communication network may be contemplated, including wireless networks as well as wired (including electrical as well as optical connection) networks.

As is already discussed an important feature of the invention is the acquisition of high accuracy relative special position of the rover relative to the controller. The following steps define a preferred way of doing it.

The first step is to identify common sources of location measurement data from a location technology. In the case of GPS or another satellite system the commonality is the common satellites that are being tracked by the controller and the rover. When the controller and rover are close it is expected that an exactly common suite of satellites can be identified. But, there may be instances when complete commonality is not available, so the general case is to define the most common suite of satellites even if one of the units has to use a satellite not used by the other. Of course as commonality is compromised, the level of accuracy of relative position may (but not necessarily) be decreased. In the case of land based location technologies the commonality refers to transmitting stations, referred to generally as land based signal sources.

Once the most common sources of measurement data are identified, there will be two sets of measurement data, one set for the controller, and one set for the rover.

Also calculations are made to determine the position of the rover relative to the controller. The employment of common measurement data provides high accuracy for determination and display of the relative spatial location of the rover relative to the controller. These calculations result in a 3D vector that represents the chord between the controller and the rover including the relative height between them. The magnitude of the vector is the distance between the controller and the rover.

In order to be able to display the FIND arrow, which is derived from the relative spatial location, the heading of the controller has to be determined. This can be done in a number of ways; using an electronic compass in which case the controller does not have to be moving or when GPS is used, obtaining heading from GPS data as the controller moves. This heading information is utilized in conjunction with controller to rover vector to enable display of the bearing arrow on the controller, which shows the direction of the rover from the controller. Also other information is calculated and displayed including relative height, relative distance, rover speed and the time that the location measurements data were captured by the rover.

Using the measurement data location information, latitude and longitude can be calculated. This allows for display of the locations of the controller and rover on a map.

As will be seen from both the foregoing and the following, configurations of a system and method vary based on among other things, where calculations are carried out. In this respect it will be appreciated that the calculation tasks do not have to be done all in one place but rather can be distributed to different portions of the system.

In the case of the system and method described above with reference to FIGS. 10-17 all the calculations are done within the rover or the controller. This type of system can be referred to as a handset based system. In the various embodiments to follow calculations may be done in a computer which is part of or otherwise available to the communications network so that selected calculations can be done not in the rover and the controller. That computer is hereafter also referred to as an application server that can be an independent, even dedicated computer, or it can be integrated into another computing facility with the special application enabled to do the selected computing.

The controller and rover can operate in conjunction with a variety of location technologies and in a number of alternative configurations. In broad terms these implementations can be considered as having two categories of location technologies; these being satellite based and land based location technology. While not necessarily exhaustive it is convenient to consider the following more specific categories as being applicable alternative embodiments of the present invention:

1. Fully autonomous GPS. One form of autonomous GPS is the handset based configuration described above. Another is use of a server based configuration in which the rover and controller acquire GPS satellites and obtain their measurement data without any assistance.

2. Both the controller and the rover use either AGPS only or a land based location technology only.

3. A hybrid in which either of the controller or the rover uses independent (autonomous) GPS while the other uses AGPS.

4. Another hybrid in which both the controller and the rover use a combination of AGPS and a land based location technology, but they obtain the best commonality of signal source of each.

5. Another hybrid that would defeat the advantages gained by the use of common measurement sources, where either the controller or the rover use satellite based location (such as AGPS or autonomous GPS) and the other uses land based location technologies.

In a general embodiment the rover and the controller are in mutual communication via a communications network such as a cellular telephone network and they each have a capability to have their location determined and provided to at least the controller by a location technology. In one set of implementations the location information is either exclusively provided by information communicated via the cellular network, or is assisted by information provided via the cellular network. In particular, the high accuracy relative spatial positions of the controller and the rover is accomplished by an application server that operates by receiving communications from the controller and the rover over the communications network. These communications provide the location measurement data and in particular the exact signal sources of the location measurement data that have been received by the controller and the rover from one or more location technologies. Then the application server filters the incoming signals from the controller and the rover to determine the most common set of signal sources, preferably completely common signal sources. In the case of GPS as the location technology the communications from the controller and the rover give the PRN numbers for the location measurement data so that location measurement data from common satellites can be used to calculate the positions of both the controller and the rover. In the case of land based location technologies, the common transmitting antennas are identified and the measurement data from them is used. Then, with the rover's location being provided to the controller the special features of the invention can be implemented, such as the FIND feature by which the relative spatial position relationship between the controller and the rover, in particular in the embodiment in which an arrow is displayed on the controller's display showing the relative direction of the rover and also showing the distance to the rover. It is possible with this embodiment to provide sufficiently high accuracy of the relative location of the controller and rover as well as their absolute location to enable the features described above to be implemented.

In the case of autonomous GPS the controller and rover acquire GPS satellites in a normal unaided way and then receive measurement data from the satellites. That measurement data is sent to the application server where the filtering for commonality is done. The rest of the process and system elements are described in detail below.

The assisted GPS (AGPS) system as implemented in the carrier network to provide location based services has been defined in a number of publications including "*Location Technologies for GSM, GPRS and UMTS Networks*", a White Paper by SnapTrack, A QUALCOMM Company and "*Geolocation and Assisted-GPS*", by Djuknic and Richton, Bell Laboratories, Lucent Technologies and "*Assisted GPS: A Low-Infrastructure Approach*", by LaMance, DeSalas and Jarvinen, in GPS World, Mar. 1, 2002. The content of all of these publications is incorporated by reference herein.

In the AGPS approach, typically the process involves an interaction between a wireless handset and the Position Determination Entity (PDE) in the carrier network. This interaction assists the handset in acquiring GPS satellites to be used in calculating the position of the handset. It is the purpose here to limit the explanation of AGPS as it is exhaustively described in the published literature such as mentioned above and known to those skilled in the art. The primary benefits of AGPS are increased speed in the time-to-first-fix (TTFF) and increase in sensitivity for acquiring satellites. That is, the handset can more quickly determine its position and can utilize weaker GPS signals. The assistance provided by the PDE is available in two fundamentally different techniques. One technique requires the PDE to transmit satellite ID, code phase and Doppler information for each satellite that should be acquired and from which measurements should be taken. Another technique requires the PDE to transmit via the carrier network to a handset a rough reference location and time and the orbit parameters for the satellites; in this case the handset is required to compute the code phase and Doppler for the satellites from which measurements should be taken; these measurements are then forwarded to the PDE. The PDE would then use this information to arrive at the absolute location of the handset in a suitable coordinate system such as latitude, longitude, and elevation values (geodetic) or Earth Centered Earth Fixed (ECEF) coordinate system. As currently contemplated, there are a number of variants or hybrids that make use of the basic AGPS concept. For purposes of the present description, and pursuant to the foregoing, given that there are various ways to implement AGPS, the following definition is intended to comprehend all means and methods that result in faster acquisition of satellites and greater acquisition sensitivity, that definition being; a means or method by which a handset is provided information from a source other than directly from the GPS satellites themselves that identifies the satellites to be tracked by the handset and provides the data needed to acquire and commence tracking those satellites so as to speed-up the commencement of tracking and to increase acquisition sensitivity.

In another embodiment an application server is introduced that is configured to communicate with the carrier network location service elements to implement the invention. The following describes application of AGPS to and as an embodiment of the present invention using an application server.

When a controller requests to find a rover, the rover and the controller interact with the PDE in the carrier network, in essence asking for AGPS service. Within this request the handsets have to give the PDE certain specifying information about their operating parameters that tells the PDE how to communicate and what to communicate to the handset for providing AGPS service. After the controller and the rover have acquired and are tracking GPS satellites the application server will interact with the system components in a manner such that the improved relative positioning between the controller and the rover useful for this invention is available. Namely, in order to obtain high precision relative position between the controller and rover, the application server will compare the satellite constellation received by each unit as a function of time. The application server will determine the greatest overlap of this data and guide the system to perform its absolute location calculation of each unit based on these more common satellites for a given time. In other words, after acquisition and tracking of satellites by the controller and the rover the intent is to provide GPS data received by the two mobile devices, the controller, and the rover, to the PDE where the specific satellites at a given time are as common as possible between the two. Of course complete commonality is preferred and will give the highest position precision of relative spatial position between the rover and the controller. Once the PDE performs its location calculation of each unit, the coordinates will be passed to the application server, which will use the information to very accurately determine relative distance and bearing of the rover with respect to the controller. This information will then be forwarded to the controller for presentation to the user as described above. During the location-gathering period, this process will continue in regular intervals as to allow for real-time, very accurate location tracking of the rover by the controller.

In another embodiment each set of locations ascertained by the PDE can be relayed to the controller where the relative distance and bearing calculations will be carried out by the controller itself.

In yet another embodiment, the raw data (such as pseudoranges) collected by the PDE can be forwarded to the controller for position calculation as well as the relative distance and bearing calculations.

In still another embodiment, following the initial AGPS assist the handsets independently collect raw data such as pseudoranges. The rover raw data is continuously sent to the controller for absolute and relative tracking. In this scenario the handsets can function together independent of the application server until such time that server assist might once again be required to calculate the relative distance and bearing of the rover relative to the controller. This alternating between server assist and independent or autonomous operation will take place as needed.

In all of the embodiments outlined, the system can enable the controller to track and locate multiple controllers or rovers if so desired (a rover is defined according to its role in the system and method-to be located and tracked by a controller-so a controller can be the rover when it is being located and tracked). In addition, the controller user can request to ascertain its own location to be provided on a map for navigation purposes as described above.

The other general category for location is land based location technologies also referred to as network based wireless triangulation systems. An example of such a system has been defined by a company named True Position. In this approach, typically the process involves Location Measuring Units (LMU) at multiple base stations collecting the raw call data from mobile handsets. The data is then used to triangulate the position of the wireless transmission using Time Difference of Arrival (TDOA) and/or Angle of Arrival (AOA) calculations. A similar approach is used for Enhanced Observed Time Difference (EOTD) where LMUs provide base station synchronization and data is sent to the Serving Mobile Location Center (SMLC) for calculations. Using this approach, when a controller requests to find a rover, the application server will interact with the components described above in a manner such that the improved relative tracking as described above can be achieved. Here, the application server will compare the data and determine the greatest overlap of base stations as a function of time between the controller and rover. The location processing of each unit will then take place in the usual manner based on the common conditions. Once the PDE (or SMLC) performs its location calculation of each device, the corrected coordinates will be passed to the application server, which would use the information to determine, more accurately, relative distance and bearing of the controller to the rover. This information will then be forwarded to the controller for visual and audible presentation to the user as described above. During the location gathering period, this process will continue in regular intervals as to allow for real-time, very accurate location tracking of the rover by the controller.

In a different embodiment each set of locations ascertained by the PDE can be relayed to the controller where the relative distance and bearing calculations will be carried out by the controller itself.

In another embodiment, the raw data from land based radio navigation devices collected by the PDE (or SMLC) can be forwarded to the controller for position calculation as well as the relative distance and bearing calculations.

In yet another embodiment, a non-mobile central unit such as a computer may track controllers and/or rovers. In all of the embodiments outlined, the system can enable the controller to track and locate multiple controllers or rovers if so desired. In addition, the user of the controller can request to ascertain his own location to be provided on the map for navigation purposes as outlined above.

Given the two location technologies (GPS/Assisted GPS and land based location), it is very likely that many systems may turn out to be hybrids. In other words, use AGPS where possible and switch to land based location when necessary due to signal reception and then back again, or the location solution may be formed by the use of measurements from both navigation measurement sources (GPS and land based location).

For all of the various embodiments that have an application server it is an ultimate purpose to present to the user/controller, the location information ascertained by the application server so as to allow the controller to locate and track the rover as described above. This information can be presented in various visual formats depending on the type of controller device. For example, on wireless phones or handsets with larger screens or Personal Digital Assistants (PDAs), the information can be provided via the mapping visuals as well as the FIND feature with a directional arrow and distance visuals (displays) as described above. On wireless devices such as cell phones or handsets with smaller screens, the general mapping information can be replaced by a text message providing the user/controller with the approximate location of the rover. This can be accomplished by providing the rover's address, street intersection, and/or region such as neighborhood/city/state/country etc. The directional arrow and distance visual along with all of its features and accompanying information as described herein can also be provided on the controller's smaller screen. It is this latter visual and accompanying information, which presents the higher precision relative information between the controller and rover.

In yet another embodiment, the raw data (such as pseudo-ranges for GPS capable systems, and timing or angular measurements in EOTD, AFLT, AOA, TDOA, etc. systems) whether collected by the handset to be provided to the controller or collected by the PDE can be forwarded to the controller for position calculation as well as the relative distance and bearing calculations by the controller.

In all of the embodiments described herein, the system can enable the controller to track and locate multiple controllers or rovers if so desired. In addition, the controller user can request to ascertain its own location to be provided on the map for navigation purposes as described herein.

For the system to function safely, privacy and security issues should also be considered. The privacy issue applies to a scenario where one controller needs to find another controller (which is regarded as a rover in this scenario). In this situation, where cell phones are being used each cell phone needs to allow the location transaction to take place. This can be done by the user during the wireless call where each user presses a button to enable the tracking to take place. This permission will be in place for the current call only and the handset will default back to disable for future calls. In this manner privacy concerns are handled by the users and no one can be tracked without knowledge. The privacy issue does not affect rovers in applications where they are placed on individuals for whom privacy is not regarded as required such as young children or the elderly or on equipment such as automobiles where privacy concerns are not regarded as being present. These cases do, however, have security concerns. Only the child's parents must be able to find the child and not anyone else who possesses a controller and happens to get the child's rover number. Among other solutions, one approach will be to password protect location transactions between a rover and a controller. The rover will only respond to a controller which sends it the correct password. The password will have been assigned to the rover by the appropriate controller (user/parent).

For purposes of this specification and for interpreting the claims the following definitions are adopted.

A rover is a mobile device which may be a handset that is adapted to have its location displayed on or otherwise available to a controller for the purpose of the controller user being able to find and track it along with the other features described between a controller and a rover, although not all features need be present in order that a device be considered to be a rover. A rover may be a device designated or considered to be a controller. Therefore a rover refers to the capability of the device to serve the functions defined herein for a rover regardless of any other functions or designation.

The terms "position" and "location" are used interchangeably unless the context indicates otherwise.

The term "absolute location" is understood in the field to refer to a location in a coordinate system, the most common being latitude and longitude in a map system.

The term "heading" is well understood in the field. A GPS receiver can determine its heading by obtaining a plurality of fixes while moving. In this description the controller is in some embodiments equipped with a compass to determine heading. In the context of use of GPS it is preferred to use GPS information to obtain heading because in general it is a more accurate measurement instrument for that attribute. The GPS heading can be used to calibrate an on-board compass.

Other definitions contained in this description are apparent from their contextual presentation.

Figure 18:
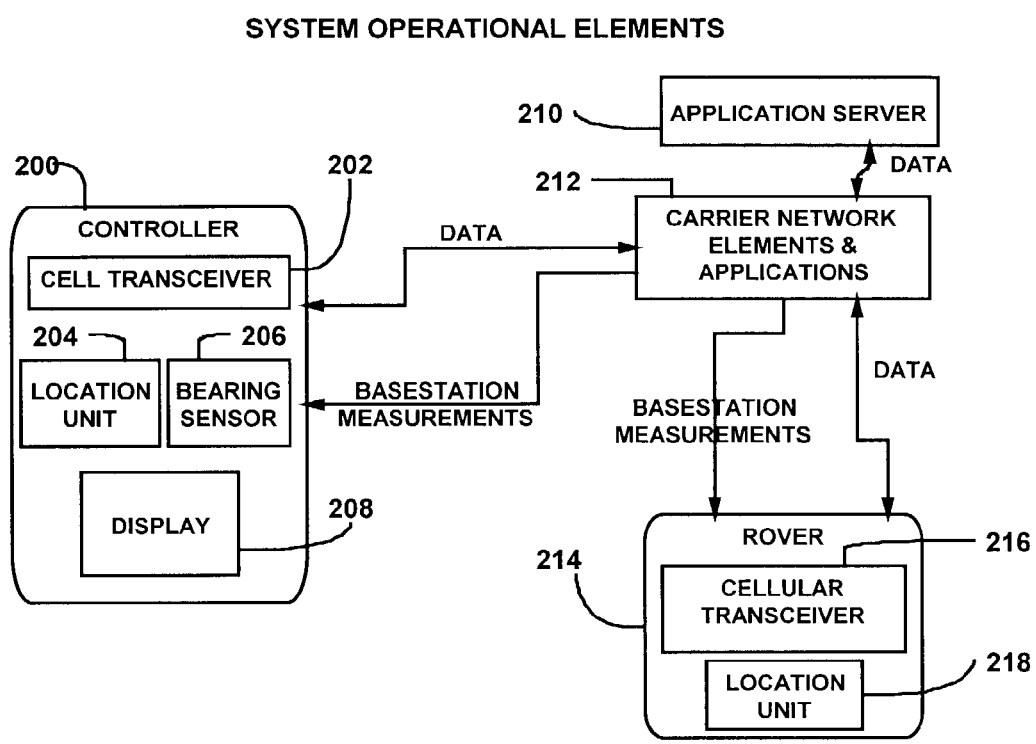
FIG. 18 is a diagram of basic system operational elements.

Referring to FIG. 18, generally the system includes a controller unit 200 equipped with a cellular transceiver 202, a location sensor 204 and a bearing sensor 206, and a display 208. As understood from the context of the description of various embodiments, a particular implementation may not require all of the elements shown in FIG. 18. The system includes carrier network elements 212 and an application server 210. The rover unit 214 contains a cellular transceiver 216 and a location sensor 218. In use the controller unit 200 can communicate with the rover unit 214 to either obtain the rover unit's position which has been either calculate by the rover unit 214 or by the application server 210 and transmitted to the rover unit 214 or to the controller unit 200 or the rover unit 214 can send measurement data to the controller unit 200 that will enable the controller unit 200 to calculate the rover unit's position. This system may utilize the carrier network elements 212 both to aid in the location computation and to aid in acquiring measurements for location calculation. The rover unit 214 will respond to commands from the controller unit 200 and transfer the appropriate data to allow calculation and presentation at the controller unit of the relative and absolute location of the rover unit 214.

Figure 19A:
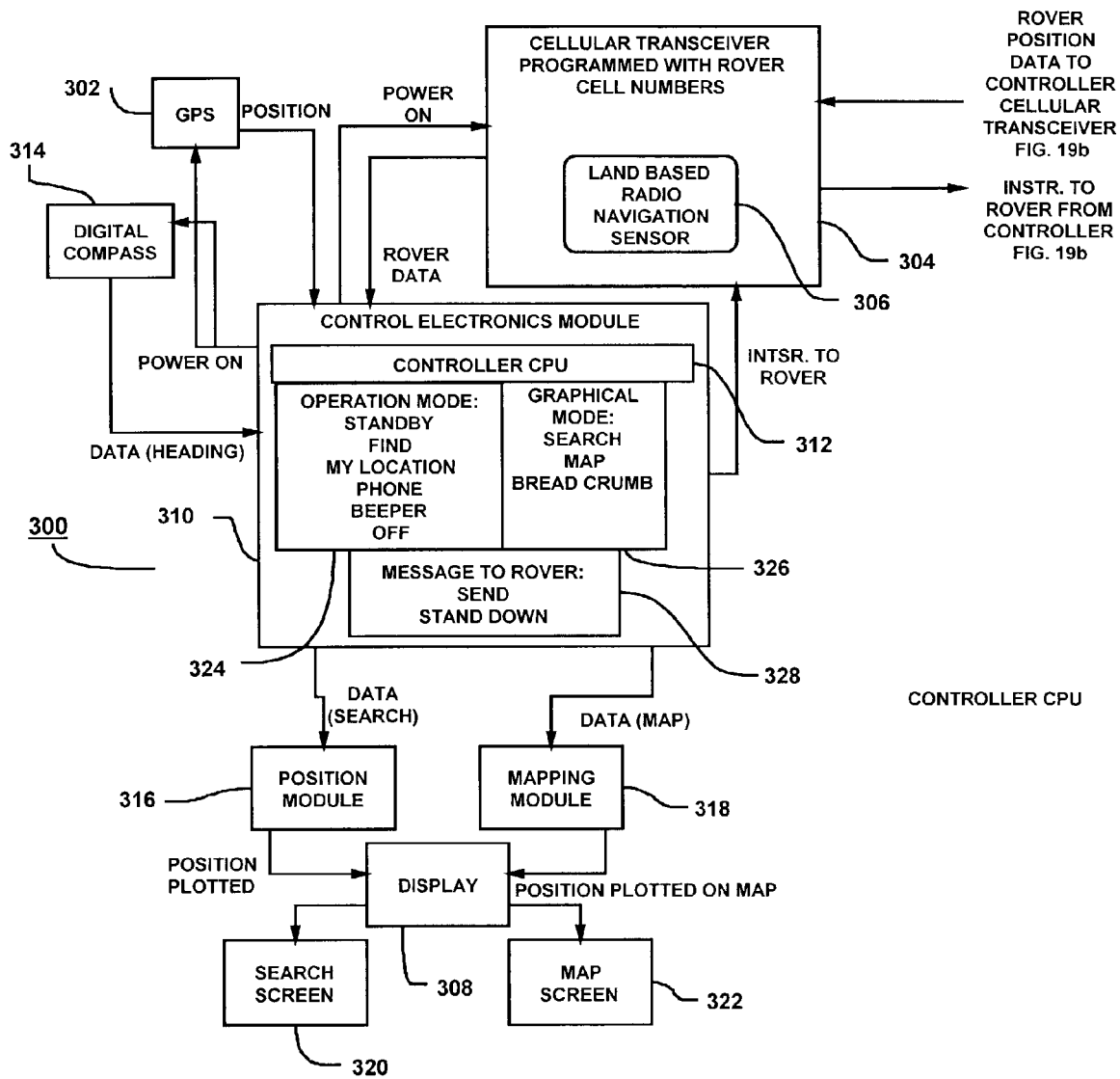
FIGS. 19a and 19b are a system operation diagram.
Figure 19B:
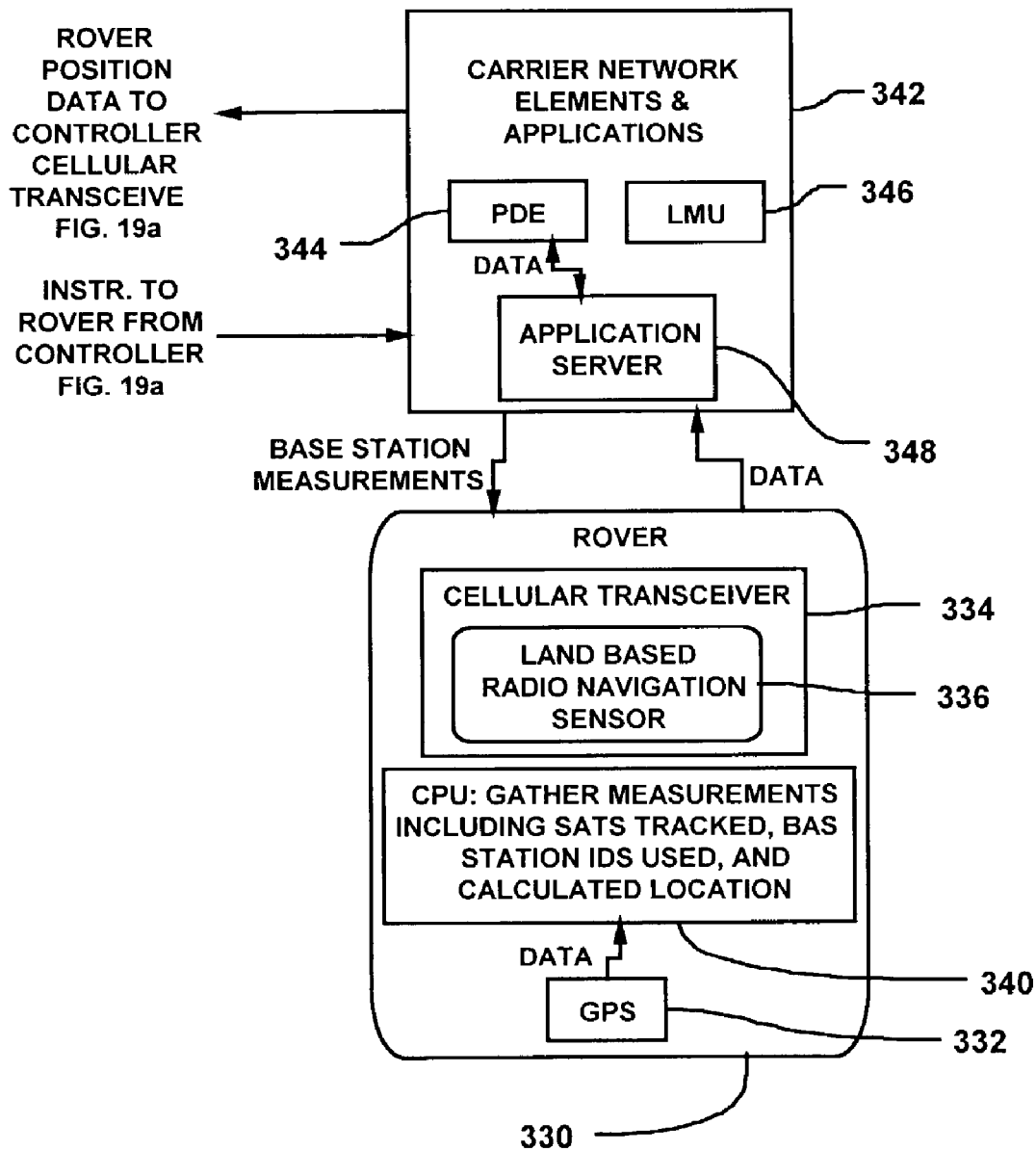

FIG. 19 shows a more detailed block diagram for the controller and the rover unit modules and their interrelationship via the carrier network using a GPS location technology and a land based location technology. The controller unit 300 has a GPS receiver 302, a cellular transceiver 304 with a land based radio navigation sensor 306, a display module 308, a control electronics module 310 including a specially programmed controller CPU 312, and a digital compass 314. There are also a position module 316 a mapping module 318 a search screen module 320 for selecting the rover unit to be located and a map screen module 322 for displaying the position of the controller or the rover or both. The controller CPU 312 has three general functional modes, an operation mode 324 for controlling the behavior of the system, including maintaining a database of rover Ids, directing and maintaining the connection to a particular rover, performing various algorithms and controlling the interface from and output to the user, a graphical mode 326 for displaying the directed arrow 154 for the relative spatial position from the controller to the rover and for displaying a map as well as the other information displayed on the FIND DETAIL screen and the MAP screen, and a message to rover mode 328 for sending messages and commands to the rover.

The rover unit 330 has a GPS receiver 332, a cellular transceiver 334 with a land based radio navigation sensor module 336, and a specially programmed CPU 340.

The carrier network 342 has a Position Determination Entity (PDE) 344, a Location Measurement Unit (LMU) 346 and an application server 348. The system can make use of these elements in variety of ways depending on the particular circumstances as seen in FIGS. 20 through 25 and as described below.

Figure 20:
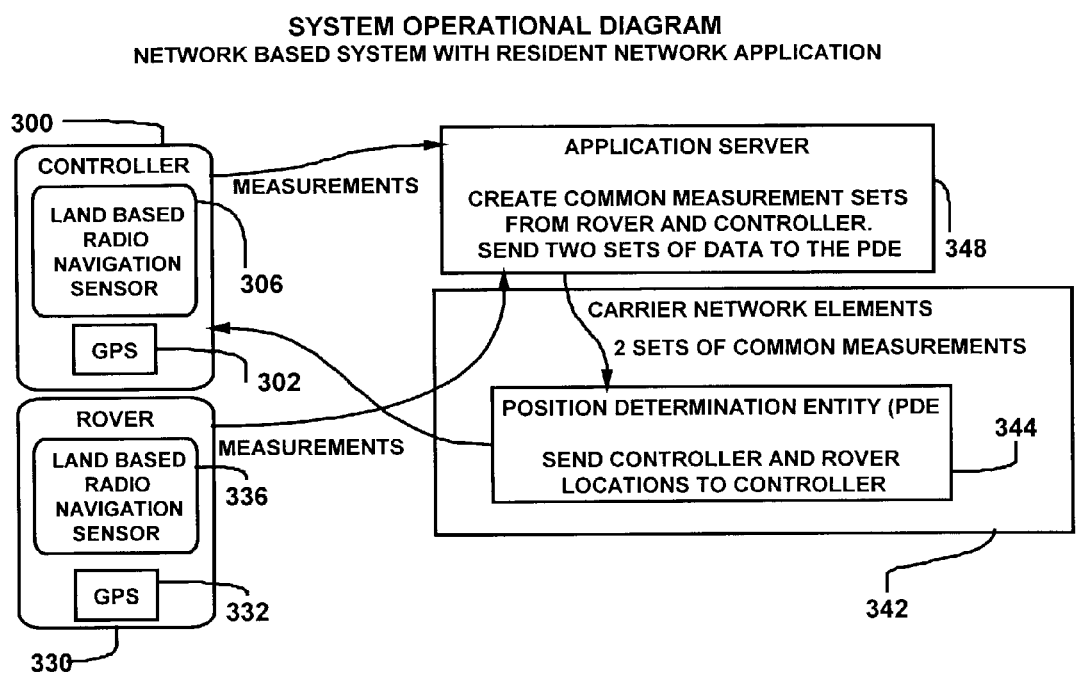
FIG. 20 is a system operation diagram.

Several modes of operation may be implemented based on the elements defined in FIG. 19. FIG. 20 shows a mode of operation in which the application server 348 is implemented so that the raw data collected at the controller 300 either via the GPS receiver module 302 or the land based location sensor 306, or both, and the raw data collected at the rover 330 also from either its GPS receiver module 332 or from its land based navigation sensor module 336, or both, would be routed to the application server 348 before going to the PDE 344. The application server 348 would perform the necessary filtering to ensure the greatest overlap of the location data, that is selecting the location measurement sources that are the most common to the rover and the controller, and sending the appropriate data to the PDE 344 for location computations of the location of the rover 330 and the controller 300. Once the PDE 344 has completed the location computation, the data would be routed back to the controller 300 where the procedure for displaying the relative spatial location of the rover relative to the controller and for absolute location of at least the rover and if possible both the rover and the controller would continue as previously described.

Figure 21:
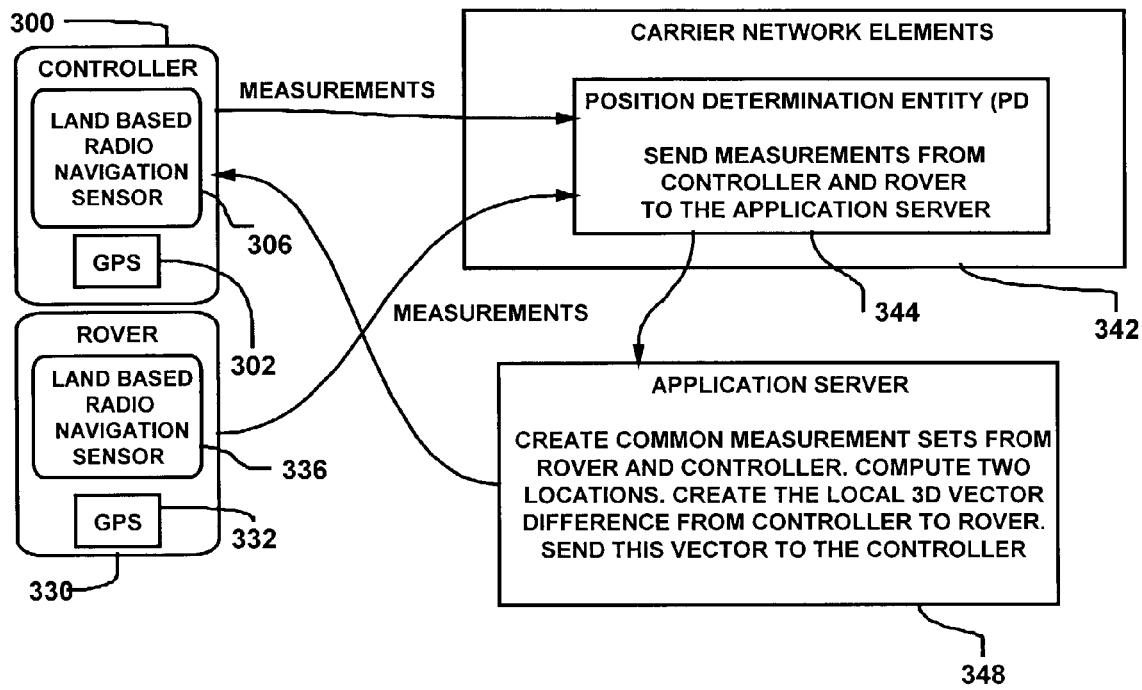
FIG. 21 is a system operation diagram.

FIG. 21 shows a an architecture which is configured such that the raw data collected at the controller 300 either via the GPS receiver module 302 or the land based location sensor 306, or both, and the raw data collected at the rover 330, from the GPS receiver module 332, or from the land based location sensor 336, or both, would be routed to the PDE 344. The PDE 344 in this instance acts merely as a data router and passes the information to the application server 348. The application server 348 would then perform the necessary filtering to ensure the greatest relative positioning accuracy described earlier, perform the related location calculations, and would route the calculated data back to the controller 300 where the procedure would continue as previously described.

Figure 22:
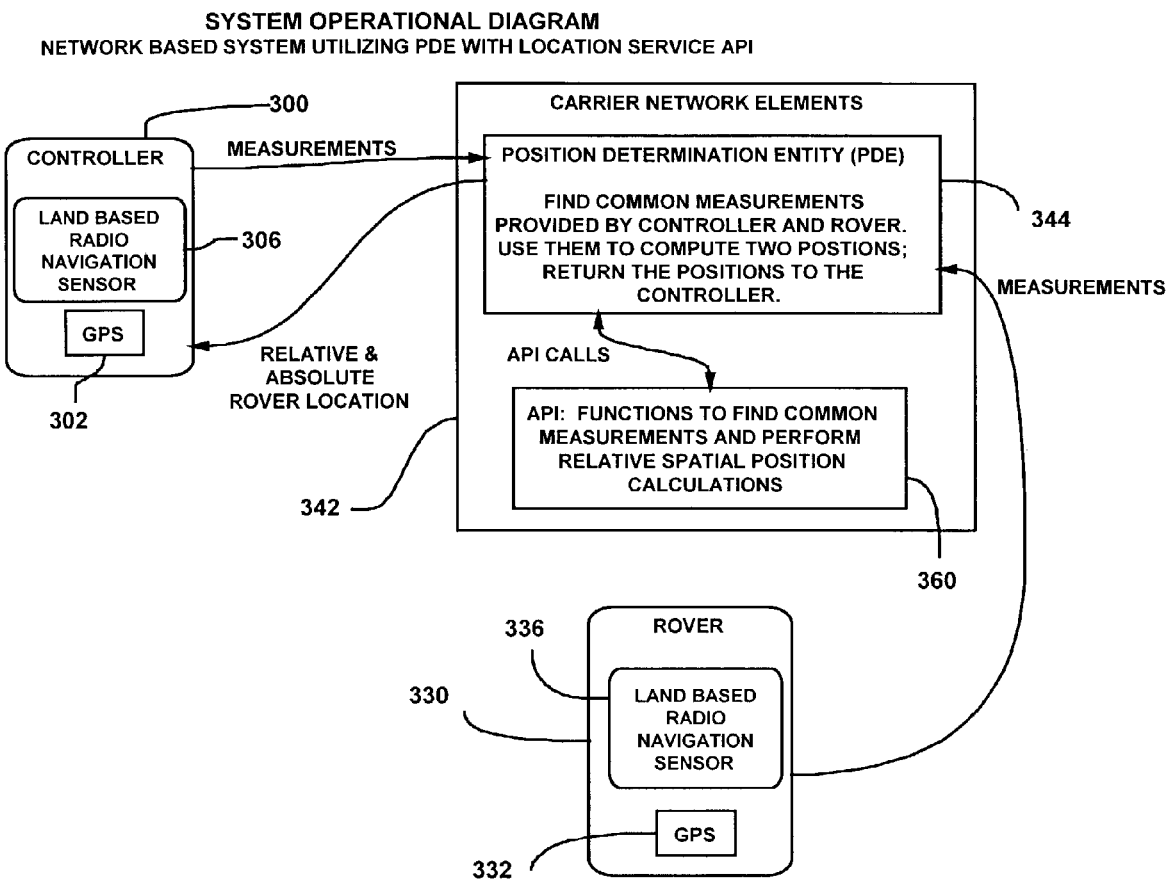
FIG. 22 is a system operation diagram.

FIG. 22 shows an architecture in which the application server functions reside on the PDE 344 or other system server. Those functions provided by the application server can be made available via a published API 360. The API 360 would be called during the PDE's 344 computations for the filtering steps to ensure greatest overlap of data as described earlier, prior to the PDE 344 performing its location calculations. In this instance the raw data collected by the controller 300 via the GPS unit 302 or the land based location sensor 306, or both, and the raw data collected at the rover 330, from the GPS unit 332, or from land based location sensor 336, or both, are routed to the PDE 344. The PDE 344 uses the API 360 calls and the functions necessary to perform the greatest relative positioning accuracy via the methods described earlier. The PDE 344 would then route the resulting data to the controller 300 where the procedure would continue as previously described.

FIGS. 23a, 23b and 23c show an architecture in which the server system functions reside in the controller 300. In this case, with or without an initial server assist, the rover 330 sends the positioning data directly to the controller. The controller 300 has three options for processing. FIG. 23a shows Option 1: The controller 300 can filter the measurements collected by the controller 300 via the GPS unit 302 or the land based location sensor 306, or both, and the measurements collected at the rover 330, from the GPS unit 332, or from the land based location sensor 336, or both and the controller presents sequentially, two sets of measurements to the network for PDE 344 computation. For each set of measurements the PDE 344 would return the resultant position, and the controller 300 would perform the relative position calculation. FIG. 23b shows Option 2: The controller 300 can do all of the filtering and the position calculations without relying on the network PDE 344 for positioning, but using the PDE 344 for aiding in acquiring GPS measurements for processing. In this instance the PDE 344 can aid the controller 300 or the rover 330 for acquisition assistance as necessary, then the controller 300 can filter the measurements collected by the controller 300 via the GPS unit 302 or the land based location sensor 306, or both, and the measurements collected at the rover 330, from the GPS unit 332, or from the land based location sensor 336, or both, and the controller 300 performs the relative and absolute location computation within its CPU. FIG. 23c shows Option 3: The controller 300 can do all of the filtering and the position calculations without relying on the network PDE 344 for positioning. In this instance the controller 300 can filter the measurements collected by the controller 300 via the GPS unit 302 or the land based location sensor 306, or both, and the measurements collected at the rover 330, from the GPS unit 332, or from the land based location sensor 336, or both, and perform the relative and absolute location computation within the CPU of the controller 300 without requiring the use of the network PDE 344

The systems described do not require any particular transport mechanism. They can be implemented using the available communication protocols required by the supporting carrier network. It should be noted however that all of the above options are quite easily supported and adjusted as more networks move towards full support of TCP/IP.

Benefits of Relative Positioning with Land Based Transceivers

As can be seen by the forgoing discussion, relative positioning plays a significant role in this system; there are a variety of reasons why this is so. In urban environments where one can expect to see multiple Base Station transceivers (typically between 3 to 7), the dominant error sources are timing errors due to the unsynchronized bursts from the transceivers and multipath (reflections off of neighboring buildings and other landscape features).

If two receivers track the same transceivers and only the common transceivers are used as measurement sources, the two receivers in question, and the location calculations for the two receivers are differenced, then the error due to the unsynchronized clock bursts are eliminated since they are common to both receivers. The dominant remaining error source is multipath. Multipath introduces errors because the Line of Sight (LOS) signals are either not present or are mixed with signals that have bounced off of the neighboring landscape (be they trees, hills or buildings). Each bounce adds a delay to the time that would be attributed to the LOS signal. The longer the added delay the worse the absolute position error becomes.

The advantage of a relative positioning technique that utilizes common measurement sources is that as the distance between two independent receivers gets smaller, the multipath environment becomes more and more similar. The greater the similarity the more accurate the relative position data becomes, since the two locations will be differenced, thus removing common errors.

When utilizing common measurement sources the measurements must be time correlated.

Additional Applications

The capabilities and methods outlined will enable the roll out of other applications including:

1. Voice Recognition—Incorporating voice recognition either at the handset or the server where the tracking application can be interacted with through voice prompts. For example "Find John", "Find Honda", "Find Me", etc.

2. Guidance for the blind—A handset can utilize the relative techniques disclosed to provide a blind person with accurate guidance as to how to navigate to a destination. For example, the user can preprogram locations of interest/way points be they home, supermarket, mom's house, etc., and when requested, the handset can give audible information to the user as to how to get to the destination of desire. For instance "walk straight 50 ft, now turn left 40 feet, etc." until the destination is reached. The way points can either be programmed as lat/long, address, or getting a lat/long fix when the user is at the destination for it to be placed in memory. The user can interact with the handset either through the keypad or voice recognition as previously described.

3. Find location of interest—The user can request location information of targets of interest such as stores or restaurants. The application can search a server database to locate the nearest 2 or 3 targets closest to the user's location (lat/long). The information can then be presented to the user on a map on the handset showing the user the targets as well as his own location. Navigation information to the target as well as bearing and distance can be provided. The user can interact with the handset either through the keypad or voice recognition as previously described. The FIND function of the system can also be used as an aid in finding a location of interest, which can be referred to as a FIND IT function. When the geocoded location such as (Latitude and Longitude) of a point of interest is known from some external source, the FIND function can display not only a map showing the location of the point of interest but also a bearing arrow showing the direction to be traveled to reach the point of interest. In addition, other useful data such as direct distance and/or distance given in compass direction can be shown. For example the user can be given information that the target location is 2.1 miles south and 0.5 miles east. Geocodes for points of interest or addresses can be obtained by having the controller call a server which has been set up for this purpose and the server will download to the controller the geocodes for each point of interest or address on the controllers FIND IT list or alternatively in the controller's address book. The address book is an application, which can be resident on the phone or PDA on which the system is installed.

4. Traffic information—The user can receive updated traffic information as he is traveling. The information can be provided on the handset utilizing the map showing his location as well as nearby and upcoming streets/highways. Streets/highways where traffic is slow/congested can be highlighted in red. The user may be able to request detail information about a red zone by clicking on it or highlighting it. The user can interact with the handset either through the keypad or voice recognition as previously described.

5. Other public/private information—Various other public data can be provided on the handset. For example, the user can request the location of a particular bus or train line in his area. This way he can assess which bus or train to catch. This information can be provided on the map in real-time. This capability can be extended to any other public or private application such as school buses, car services, taxis, etc. The only requirement is that the application needs access to a database where the information is maintained. The user can interact with the handset either through the keypad or voice recognition as previously described.

6. Self Navigation—In addition to finding "Me" which displays the user's current location on a map, the user can also enter a fixed destination such as an address. The destination can be entered either through the keypad or voice recognition. The system can then display the location of the destination in addition to the user's current position on the map for self navigation purposes. The system can also provide turn-by-turn instructions to the user to help in navigating to the destination.

The invention can be implemented in a service for users whose handsets are appropriately equipped with a specially programmed application server deployed by the service provider in communication with the communication network being employed. The application server does the filtering to obtain the most commonality of satellites or of land based sources of measurement data. The implementation of an application server as described above to filter measurement data and make calculations can be in a manner where the application server is co-located with the PDE or it can be located at a desirable location on the internet or any other accessible network. In this manner, application servers for other purposes, such as storing mapping data, can also be co-located with the PDE or can be located at a desirable location on the internet or any other accessible network. It is envisaged that such an application server could be implemented to calculate and provide data for a fee or as part of a chargeable service offered by service providers such as the cellular telephone network operators like AT&T, Verizon, Sprint and others.

Another method for achieving precise relative location of the rover with respect to the controller is to compute relative differential corrections from the measurement taken at the controller and applied to the measurements taken at the rover. This is done by using pseudorange residuals from the measurements taken at the controller to create corrections and then applying the corrections to the rover measurements. The corrections can be generated either within the controller or within the network. The corrections can then be sent either in a proprietary message format or as standard RTCM 104 DGPS correction messages. Similarly the corrections can be applied at the network or at the rover or at the controller for the measurements taken at the rover. By "relative" DGPS corrections it is meant that even though the controller is not at a known static location, the controller's location can be calculated from the measurements taken at the controller, and the pseudorange residuals, relative to this computed location can then be used to create corrections Although particular embodiments of the invention have been described and illustrated herein, it is recognized that modifications and variations may readily occur to those skilled in the art, and consequently it is intended that the claims be interpreted to cover such modifications and equivalents thereof under the doctrine of equivalents or under 35 U.S.C.112.

The invention claimed is:

1. A system for locating and tracking a mobile rover from a mobile controller said system being operable with a communication network for communication between them and with at least one location technology source for transmitting location related measurement data applicable to computation of the location of the controller and computation of the location of a rover said system comprising;

a mobile controller having a receiver for receiving location measurement data from a location technology source and a communication module for receiving and sending communications via the communication network and a means for determining the heading of the controller;

a mobile rover having a receiver for receiving location measurement data from the location technology source and a communication module for receiving and sending communications via the communication network;

one or more specially programmed computer elements enabled to receive and process location related measurement data from signals received by the controller and the rover respectively from the location technology source, to determine the most common set of location measurement data sources to be used for further calculations and using said data to determine the relative spatial position of the rover relative to the controller and further using the means to determine the heading of the controller to determine the bearing of the rover relative to the position and heading of the controller and the controller having a display module enabled to display a bearing line to the rover from the controller.

2. The system of claim 1 in which the controller is enabled to locate and track a plurality of rovers and can select among the plurality of rovers one or more that is desired to be located and tracked.

3. The system of claim 1 in which the location technology source is a satellite based location technology.

4. The system of claim 3 in which the location technology source is GPS and the most common set of location measurement data sources includes a common suite of GPS satellites being tracked by both the controller and the rover.

5. The system of claim 3 in which the satellite based location technology comprises the Galileo system.

6. The system of claim 4 in which AGPS is available and either at least the rover is or both the rover and the controller are enabled to receive and use assistance from AGPS enabled equipment.

7. The system of claim 6 in which the location technology comprises an MS based AGPS assistance capability.

8. The system of claim 6 in which the location technology comprises a network based AGPS.

9. The system of claim 6 in which the location technology is enabled to be the selective use of either autonomous GPS or AGPS based on selected criteria.

10. The system of claim 1 in which the location technology source is a land based location technology.

11. The system of claim 1 in which the location technology source is a hybrid of land based location technology and satellite based location technology.

12. The system of claim 1 in which one of the specially programmed computer elements is an application server that determines the most common set of location measurement data sources of the controller and of the rover sent to it via the communication network and the relative spatial position of the rover relative to the controller are determined using the most common set.

13. The system of claim 12 wherein a specially programmed computer element is enabled to determine the absolute position of either the rover alone or both the controller and the rover and a display at the controller is enabled to display the absolute map position or positions of the rover or of the rover and the controller.

14. The system of claim 12 in which the location technology source is a satellite based location technology.

15. The system of claim 14 in which the location technology source is GPS and the most common set of location measurement data sources includes a common suite of GPS satellites being tracked by both the controller and the rover.

16. The system of claim 15 in which AGPS is available and either at least the rover is or both the rover and the controller are enabled to receive and use assistance from AGPS.

17. The system of claim 16 in which the location technology comprises an MS based AGPS assistance capability.

18. The system of claim 16 in which the location technology comprises a network based AGPS.

19. The system of claim 16 in which the location technology is enabled to be the selective use of either autonomous GPS or AGPS based on selected criteria.

20. The system of claim 12 in which the location technology source is a land based location technology.

21. The system of claim 20 in which the land based location technology is selected from the group consisting of AFLT, EOTD, TDOA, UTDOA, and AOA.

22. The system of claim 12 in which the location technology source is a hybrid of land based location technology and satellite based location technology.

23. The system of claim 22 in which the satellite based location technology comprises GPS and the land based location technology is selected from the group consisting of AFLT, EOTD, TDOA, UTDOA, and AOA.

24. The system of claim 12 in which the satellite based location technology comprises the Galileo system.

25. The system of claim 1 wherein a specially programmed computer element is enabled to determine the absolute position of either the rover alone or both the controller and the rover and a display at the controller is enabled to display the absolute map position or positions of the rover or of the rover and the controller.

26. A system for locating and tracking a mobile rover from a mobile controller said system being operable with a wireless communication network operating with an AGPS enabled system comprising;
    a mobile controller comprising;
        a wireless communication module enabled to communicate via the wireless communication network;
        a GPS module enabled to function in an AGPS mode to obtain AGPS assistance over the wireless communication network and to receive GPS location measurement data from GPS satellites;
        a means selected from one of (a) a compass, (a) use of GPS by the controller moving or both (a) and (b) to provide heading of the controller;
    a mobile rover comprising;
        a wireless communication module enabled to communicate with the wireless communication network;
        a GPS module enabled to function in an AGPS mode to obtain AGPS assistance over the wireless communication network and to receive GPS location measurement data from GPS satellites;
    means for selecting common GPS satellites from which both the controller and the rover are receiving location measurement data;
    means for calculating the relative spatial position of the rover relative to the controller using at least the common GPS satellites;
    means for making calculations to enable display of and to display on the controller a map showing the position of the rover or of both the rover and the controller;
    means to enable determination of and to display on the controller an indicator of bearing from the controller to the rover.

27. The System of claim 25 in which the controller is enabled to display the distance to the rover from the controller.

28. The system of claim 25 in which the controller is enabled to display the height of the rover relative to the controller.

29. The system of claim 25 in which the controller is enabled to display a trail of locations of the rover as the rover moves.

30. The system of claim 25 in which the means for selecting common satellites is an application server associated with the communications network.

31. The system of claim 25 in which the means for calculating the relative spatial position of the rover relative to the controller is a computing element associated with the communications network.

32. The system of claim 25 in which the means for calculating the relative special position of the rover relative to the controller is a computing element in the controller.

33. The system of claim 25 in which the means to enable determination of the bearing of the rover from the controller comprises;
    a means for determining the heading of the controller and a computing element in the controller for calculating the bearing to the rover.

34. A method for locating and tracking a mobile rover from a mobile controller the rover and the controller being operable with a communication network for communication between them and being operable with at least one location technology source for receiving and transmitting selected location related measurement data applicable to computation of the location of the controller and computation of the location of the rover comprising;
    intiating the procedure for locating and tracking the rover by a signal to the rover from the controller;
    commencing at the rover and the controller the reception of location related measurement data from a location technology source;
    sending from the rover via the communication network location related measurement data that will enable computation of its location, to an application server that is associated with the communication network and which is enabled to receive and process such data from many rovers and controllers;
    sending from the controller via the communication network location related measurement data that will enable computation of its location, to the application server;
    determining at the application server a set of most common sources of location measurement data from the rover and the controller to be used to determine the relative spatial location of the rover relative to the controller;
    using the most common set of location measurement data, calculating at a specially programmed computing element the relative spatial location information of the rover relative to the controller and the absolute position of the rover and the controller;
    determining by use of a means for determining the heading of the controller, in the controller, the heading of the controller;
    using in the controller the relative spatial location information of the rover relative to the controller to present through a display, bearing of the rover relative to the controller and if absolute positions have been calculated displaying absolute location on a map of the rover or both the rover and the controller and wherein the display of bearing or the map display are alternatively selectable.

35. The method of claim 34 further wherein the determined most common set of location measurement data is sent to the controller and the controller having a said computing element, calculating at the controller the relative spatial location of the rover relative to the and calculating at the controller the absolute position of the controller and the rover.

36. The method of claim 34 further comprising calculating at the controller the latitude and longitude of the rover and the controller for display of their location on a map.

37. The method of claim 34 in which the location technology is GPS and the application server determines the most common set of GPS satellites being tracked by the rover and the controller.

38. The method of claim 37 further comprising enabling the rover and the controller to receive and use assistance from an AGPS source.

39. The method of claim 38 further comprising calculating at the controller the latitude and longitude of the rover and the controller for display of their location on a map.

40. The method of claim 38 in which the controller is equipped with a compass to provide its heading or is enabled to provide heading of the controller from movement of the controller or to allow use of both and to calculate and to display either of the bearing of the rover relative to the controller or of both the bearing of the rover relative to the controller and the distance to the rover.

41. The method of claim 40 further comprising calibrating the compass by means of GPS heading information.

42. The method of claim 34 further comprising enabling the rover and the controller to receive and use assistance from an AGPS source.

43. The method of claim 34 further comprising;
providing specially programmed computer element in association with the communications network to perform calculations from the most common set of location measurement data as determined by the application server of the relative spatial location of the rover relative to the controller and if implemented for a map display, the absolute locations of the rover and the controller and sending the results to the controller for display.

44. The method of claim 34 in which both the controller and the rover obtain their location related measurement data from a land based location technology source.

45. The method of claim 34 further comprising;
if map display is enabled, using successive location determinations of the rover displaying on the map display a series of indicia showing a history of the location if the rover.

46. The method of claim 34 further displaying on the controller one or more of the following;
the speed of movement of the rover;
the altitude of rover relative to the mobile controller; and
geographical coordinates of the rover.

47. The method of claim 34 wherein the controller and the rover comprise cellular handsets designed to measure time delays or time differences from land based transceivers and the rover and controller use information from commonly observed transceiver signals at the same given time to provide relative spatial positions.

48. The method of claim 34 further comprising use of AOA location technology.

49. A system for locating and tracking a mobile rover from a mobile controller said system being operable with a communication network for communication between them and with at least one location technology source for transmitting location related measurement data applicable to computation of the location of the controller and computation of the location of a rover said system comprising;
a mobile controller having a receiver for receiving location measurement data from a location technology source and a communication module for receiving and sending communications via the communication network and a means for determining the heading of the controller;
a mobile rover having a receiver for receiving location measurement data from the location technology source and a communication module for receiving and sending communications via the communication network;
one or more specially programmed computer elements enabled to receive and process location related measurement data from signals received by the controller and the rover respectively from the location technology source, to determine the most common set of location measurement data sources to be used for further calculations and using said data to determine the relative spatial position of the rover relative to the controller and further using the means to determine the heading of the controller to determine the bearing of the rover relative to the position and heading of the controller and the controller having a display module enabled to display a bearing line to the rover from the controller and wherein one of the specially programmed computer elements is an application server that determines the most common set of location measurement data sources of the controller and of the rover sent to it via the communication network and the relative spatial position of the rover relative to the controller are determined using the most common set and wherein the location measurement data of the most common set of location measurement data sources as determined by the application server is sent to a selected one of;
a computer element associated with the network that calculates the relative spatial position of the rover relative to the controller and then sends the result via the communications network to the controller; or
to the controller via the communications network and a specially programmed computer element at the controller computes the relative spatial position of the rover relative to the controller.

50. The system of claim 49 in which the location technology source is GPS and the most common set of location measurement data sources includes a common suite of GPS satellites being tracked by both the controller and the rover.

51. The system of claim 50 in which AGPS is available and either at least the rover is or both the rover and the controller are enabled to receive and use assistance from AGPS.

52. The system of claim 51 in which the location technology comprises an MS based AGPS assistance capability.

53. The system of claim 51 in which the location technology comprises a network based AGPS.

54. The system of claim 51 in which the location technology is enabled to be the selective use of either autonomous GPS or AGPS based on selected criteria.

* * * * *